(12) United States Patent
Low et al.

(10) Patent No.: US 9,009,746 B2
(45) Date of Patent: Apr. 14, 2015

(54) SECURE TRANSACTION THROUGH A TELEVISION

(75) Inventors: Gak Wee Low, Sunnyvale, CA (US); Mark Wenger, San Francisco, CA (US); Prashant Jamkhedkar, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/420,654

(22) Filed: Mar. 15, 2012

(65) Prior Publication Data

US 2012/0240138 A1    Sep. 20, 2012

Related U.S. Application Data

(60) Provisional application No. 61/453,843, filed on Mar. 17, 2011.

(51) Int. Cl.
| | |
|---|---|
| *H04N 7/16* | (2011.01) |
| *H04N 7/167* | (2011.01) |
| *G06Q 20/02* | (2012.01) |
| *H04N 21/258* | (2011.01) |
| *H04N 21/25* | (2011.01) |
| *G06Q 20/40* | (2012.01) |
| *G06Q 20/12* | (2012.01) |
| *G06Q 30/06* | (2012.01) |

(52) U.S. Cl.
CPC .......... *G06Q 20/02* (2013.01); *H04N 21/25875* (2013.01); *H04N 21/25816* (2013.01); *H04N 21/25* (2013.01); *G06Q 20/40* (2013.01); *G06Q 20/12* (2013.01); *G06Q 30/06* (2013.01)

(58) Field of Classification Search
CPC ............ H04N 21/25; H04N 21/25816; H04N 21/25875
USPC ............................................ 725/5, 25, 23, 31
See application file for complete search history.

(56) References Cited

U.S. PATENT DOCUMENTS

| | | | | |
|---|---|---|---|---|
| 2001/0027441 | A1* | 10/2001 | Wankmueller | 705/41 |
| 2003/0110507 | A1* | 6/2003 | Dimitrova et al. | 725/110 |
| 2010/0060802 | A1* | 3/2010 | Huegel | 348/734 |
| 2011/0206202 | A1* | 8/2011 | Cocchi et al. | 380/239 |
| 2011/0320476 | A1* | 12/2011 | McRae | 707/769 |

OTHER PUBLICATIONS

Tvwallet Store: Official Online Store for Tvwallter webpage, http://www.tvwallet.com/, 1 page.
Vega, Tanzina, "With a Click of the Remote, Impulse Purchases," published in The New York Times, Dec. 5, 2011, http://www.nytimes.com/2011/112/05/business/media/history-channel, 3 pages.

* cited by examiner

*Primary Examiner* — Pankaj Kumar
*Assistant Examiner* — Franklin Andramuno
(74) *Attorney, Agent, or Firm* — Haynes and Boone, LLP

(57) ABSTRACT

The present disclosure involves a method of conducting a transaction. In one aspect, the method includes: displaying a media program on a media display device; indicating, while the media program is being displayed, an item associated with the media program is available for purchase; receiving authentication information of a prospective purchaser of the item; and completing a purchase of the item in response to the authentication information. In another aspect, the method includes: receiving, from a media display device, a user authentication request that contains user login credentials; granting the user authentication request in response to the user login credentials; and sending an authentication permission to the media display device; wherein the receiving and the sending are each performed such that the user login credentials and the authentication permission are sent through one or more intermediate hops without being inspected by any of the intermediate hops.

21 Claims, 20 Drawing Sheets

SECURE TRANSACTION THROUGH A TELEVISION

CROSS REFERENCE TO RELATED APPLICATION

The present application claims priority to U.S. Provisional Patent Appl. Ser. No. 61/453,843, filed Mar. 17, 2011 and titled "PAYMENT AUTHENTICATION AND AUTHORIZATION NON-WEB DEVICES," which is incorporated by reference in its entirety. The present application is also related to concurrently filed U.S. application Ser. No. 13/420,663 entitled "SINGLE DIGITAL WALLET ACROSS MULTIPLE PAYMENT PLATFORMS," and U.S. application Ser. No. 13/420,685 entitled "MAKING INTERACTIVE PURCHASES THROUGH A MEDIA DISPLAY DEVICE,", both of which are incorporated by reference in their entirety.

BACKGROUND

1. Technical Field

The present disclosure generally relates to conducting electronic transactions and, more particularly, to conducting transactions using a media display device such as a television set.

2. Related Art

Before the rise of electronic media, consumers usually go to physical "brick and mortar" stores to conduct their purchases. As electronic commerce became increasingly popular in recent years, consumers have been given more options to complete their shopping without leaving their homes. For example, the consumer may see a product advertised during a TV infomercial. If the consumer wishes to purchase the product, he may then call the merchant selling the product or go to the merchant's website to complete the purchase. However, transactions like the one described above may be cumbersome (for example, they require the consumer to leave the TV), may not be interactive enough, and may also lack sufficient security.

Therefore, while existing electronic commerce transactions involving TVs have been generally adequate for their intended purposes, they have not been entirely satisfactory in every aspect. It would be advantageous to make it easier for prospective consumers to conduct secure transactions through a TV.

SUMMARY

One aspect of the present disclosure provides a method of conducting an electronic transaction. The method includes: receiving, from a media display device, a user authentication request, wherein the user authentication request contains user login credentials; granting the user authentication request in response to the user login credentials; and thereafter sending an authentication permission to the media display device; wherein the receiving the user authentication request and the sending the authentication permission are each performed such that the user login credentials and the authentication permission are sent through one or more intermediate hops without being inspected by any of the intermediate hops.

One aspect of the present disclosure provides an apparatus comprising a non-transitory, tangible machine-readable storage medium storing a computer program. The computer program contains machine-readable instructions that when executed electronically by processors, perform: receiving, from a media display device, a user authentication request, wherein the user authentication request contains user login credentials; granting the user authentication request in response to the user login credentials; and thereafter sending an authentication permission to the media display device; wherein the receiving the user authentication request and the sending the authentication permission are each performed such that the user login credentials and the authentication permission are sent through one or more intermediate hops without being inspected by any of the intermediate hops.

One aspect of the present disclosure provides a method of conducting an electronic transaction. The method includes: receiving a request to access a payment provider server from a user, wherein the request is received through a media display device; collecting, in response to the receiving the request, user data for authenticating the user with the payment provider server; and sending the user data to the payment provider server, wherein the sending the user data is performed so that the user data is sent through one or more intermediate hops without being inspected by any of the intermediate hops before the user data reaches the payment provider server.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

Before the rise of electronic media, consumers usually had to conduct their shopping outside their homes. A prospective consumer would have to go visit one or more physical "brick and mortar" stores to survey the merchandise available at each store. If the consumer is interested in a piece of merchandise, he then buys and pays for the merchandise at the store that offers it for sale.

As electronic commerce became more popular in recent years, consumers have been given more flexibility regarding being able to do shopping without having to leave their homes. For example, a consumer may see a product being advertised while watching an infomercial on television (TV).

The infomercial may display the merchant's phone number and/or website address. If the consumer is interested in purchasing the product, he may call the merchant or log on to the merchant's website to complete the purchase. However, these types of transactions may be inconvenient to the consumer, as the consumer may not be able to instantly buy the product but may be forced to leave the TV. In addition, these transactions may not be secure enough.

According to the various aspects of the present disclosure, an improved method of conducting a transaction through a TV is disclosed, as discussed in more detail below.

Figure 1:
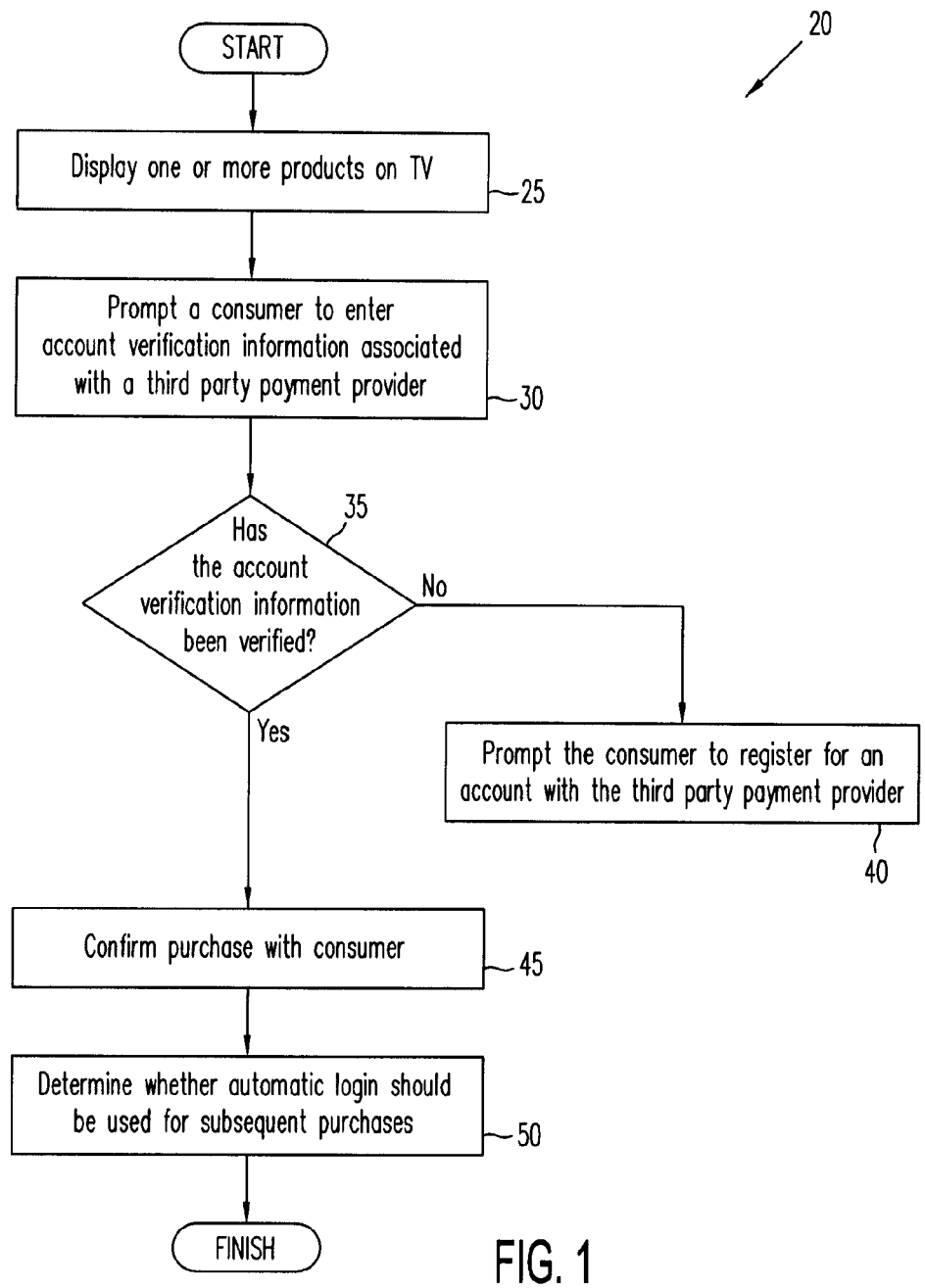
FIG. 1 illustrates an example flowchart for performing a transaction according to various aspects of the present disclosure.

FIG. 1 is a flowchart illustrating a method 20 of purchasing a product via a TV set through a third party payment provider/platform. For example, the third party payment provider may be PAYPAL, INC®. of San Jose, Calif. or another suitable financial institution. The method 20 includes a step 25, in which one or more products or pieces of merchandise is displayed on TV during a TV program. The products may include physical and tangible goods, including (but not limited to) clothing, electronics, tools, toys, household appliances, books, movies, automotive components, sporting goods, groceries, etc. The products may also include digital goods, which include goods that are stored, delivered, and/or used in an electronic format. As non-limiting examples, digital goods may include electronic-books, digital music, digital images, digital videos, virtual items, etc. The virtual items may be virtual currency or other types of precious items (e.g., virtual gold, virtual weapons/armor, virtual medicine, virtual gems) that can be obtained and used in a virtual reality role-playing computer game. In some cases, the "product" being offered may even include an opportunity to donate to a charity.

The method 20 continues with a step 30, in which a consumer is prompted to enter his account verification information associated with the third party payment provider. In some embodiments, the consumer may be prompted to enter his mobile telephone number (or another suitable personal identification number (PIN)) linked to his account with the third party payment provider. In other embodiments, the consumer may be prompted to enter a username and a password that are associated with his account with the third party payment provider. In certain embodiments, the consumer may be allowed to choose to enter either the mobile telephone number, or the username and password, or another suitable identifier associated with his account.

The method 20 continues with a decision step 35 to determine if the account information has been verified. In embodiments where the consumer chooses to enter a mobile telephone number (or another suitable PIN), the decision step 35 checks to see if the entered mobile telephone number or PIN matches any existing numbers associated with the third party payment provider. If the answer is no, then the method 20 may proceed to a step 40, in which the consumer is prompted to register for an account with the third party payment provider. In some embodiments, if the consumer wishes not to register for an account, a guest PIN may be sent to the consumer (e.g., as a text message to the consumer's mobile telephone or as an email to the consumer's email address) upon the consumer's request. The guest PIN provides a temporary login for the consumer to complete the transaction.

In a similar manner, in embodiments where the consumer chooses to enter a username and a password, the decision step 35 checks to see if the combination of entered username and password matches an existing account with the third party payment provider. If the answer is no, then the method 20 proceeds to the step 40, in which the consumer is prompted to register for an account with the third party payment provider.

Once again, if the consumer chooses not to register for an account at this time, a temporary guest login may be sent to the consumer to complete the transaction.

If the answer from the decision step 35 is yes—whether as a result of a matched mobile phone number or a correct combination of username and password being entered—the method 20 continues with a step 45 in which the purchase is confirmed with the consumer. In various embodiments, the purchase confirmation may display to the consumer information such as the consumer's name and address as well as the product's name, quantity, and price. In some embodiments, as a part of the execution of the step 45, the consumer may be given an option to change one or more aspects of the purchase, including but not limited to the quantity or the consumer's shipping address.

The method 20 continues with a step 50, in which it is determined whether automatic login should be used for subsequent purchases. In some embodiments, the consumer may be specifically prompted as to whether he would prefer to have the login information "remembered" for his subsequent purchases. Having the login information "remembered" is convenient when the consumer lives alone and/or is using his own TV at home. On the other hand, if the consumer is traveling (e.g., watching a TV program at a hotel at which he is staying) or has to share the TV with other roommates, then the consumer may choose not to have his login information remembered for security purposes. Based on the answer received form the consumer, the method 20 may either "remember" or discard the login information.

It is understood that the method 20 discussed above merely illustrates an example process flow and is not intended to be limiting, and that additional steps may be performed before, during, or after the steps 25-50 of the method 20. To facilitate a better understanding of the various aspects of the method 20, FIGS. 2-9 are provided to graphically illustrate some embodiments of the method 20.

Figure 2:
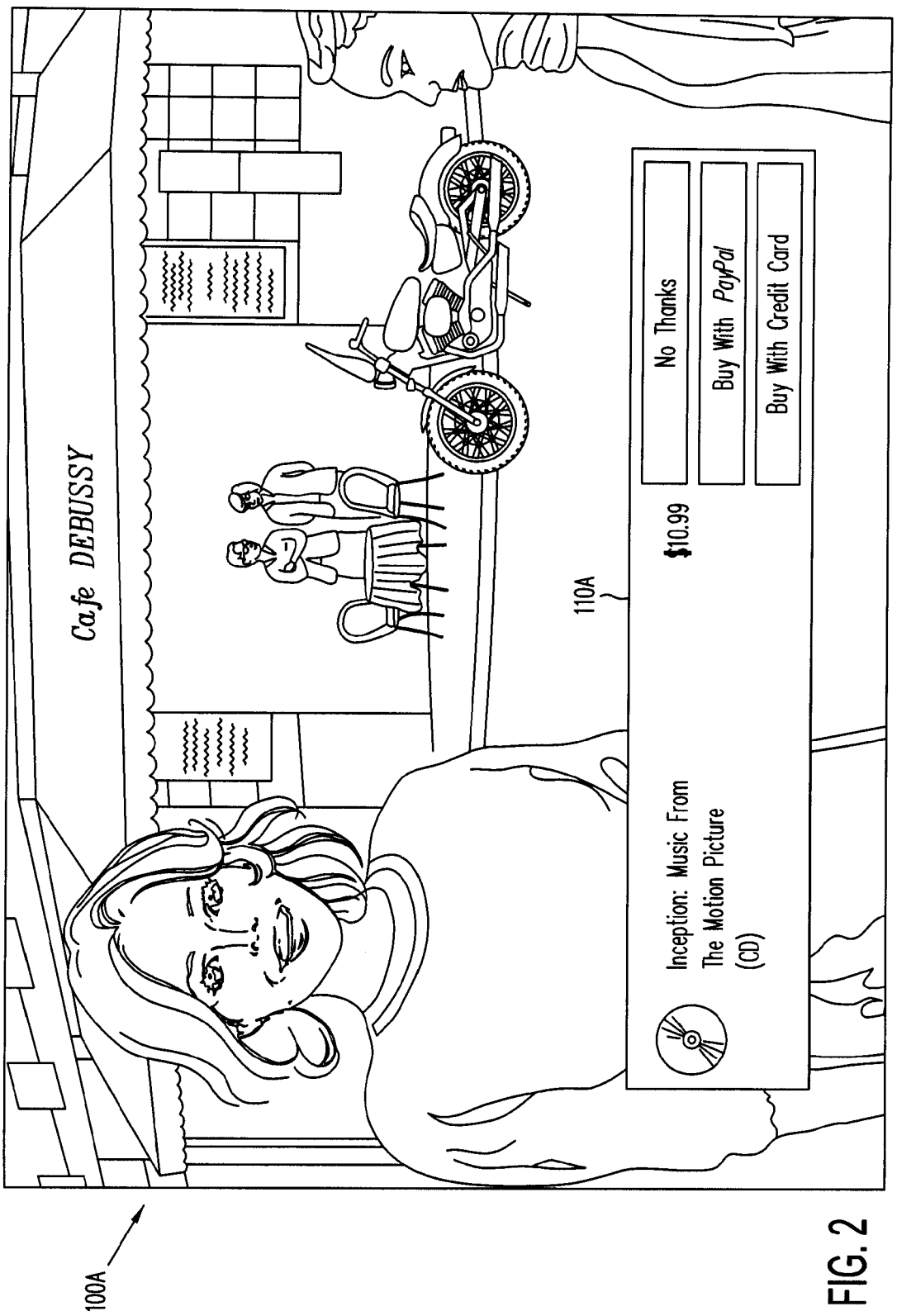
FIGS. 2-9 illustrate example user interfaces for conducting a transaction through a television according to various aspects of the present disclosure.

Referring to FIG. 2, an example user interface 100A is displayed. According to the various aspects of the present disclosure, the user interface 100A is a screenshot of a TV program that the consumer is watching. In some embodiments, the TV program may be a movie, a TV show, a music video, a commercial, a documentary, an educational program, a sporting event, a video game, or another suitable media program displayed on the consumer's TV set. According to certain aspects of the present disclosure, the TV program is being displayed to the TV set through a video stream (or data stream). At various points of the video stream, there are embedded trigger points in the video stream to notify the consumer that an offer for a merchandise is available.

In some embodiments, the offer may be displayed as a text box (or a dialog box) 110A, which contains a brief description of the product being offered. As discussed above with reference to FIG. 1, the product being offered may be a tangible piece of merchandise or a digital item. As an example, the product being offered in FIG. 2 is the musical soundtrack from the TV program, which is a movie. As other non-limiting examples, the product being offered may be a piece of clothing (e.g., for a specific brand name) that the actor/actress is wearing, a coupon for a restaurant or store shown in the background, or a deal to buy an item appearing in the scene of the TV program (e.g., a 20% off offer to buy a motorcycle that is shown in the scene). In other words, the product being offered is integrated into or "embedded" within the TV program. At predetermined times while the TV is program is being shown to the consumer, the right offers will be triggered and be displayed to the consumer.

In some embodiments, the availability of the offer will initially be displayed as a small icon (not illustrated herein), which may be shown unobtrusively near a corner of the screen so as to not disrupt the consumer's viewing of the TV program. The icon may or may not indicate what the product being offered will be. If the consumer is interested in finding out more about the offer, he can click on the icon, which may then expand into the text box 110A shown in FIG. 2. In certain embodiments, the consumer may be given a choice with respect to how he wishes to be notified of the offer: he may elect not to be notified of any offers at all, or he may elect to be first notified of an availability of an offer with the small unobtrusive icon, or he may elect to be notified of the offer with a text box such as the text box 110A of FIG. 2. The consumer may set these preferences before or during the TV program is being played.

In addition to displaying the description of the product being offered, the text box 110A may also display the price and/or quantity of the product, as well as one or more payment options. For example, a logo of the third party payment provider (e.g., PAYPAL) may be displayed as one of the payment options.

Figure 3:
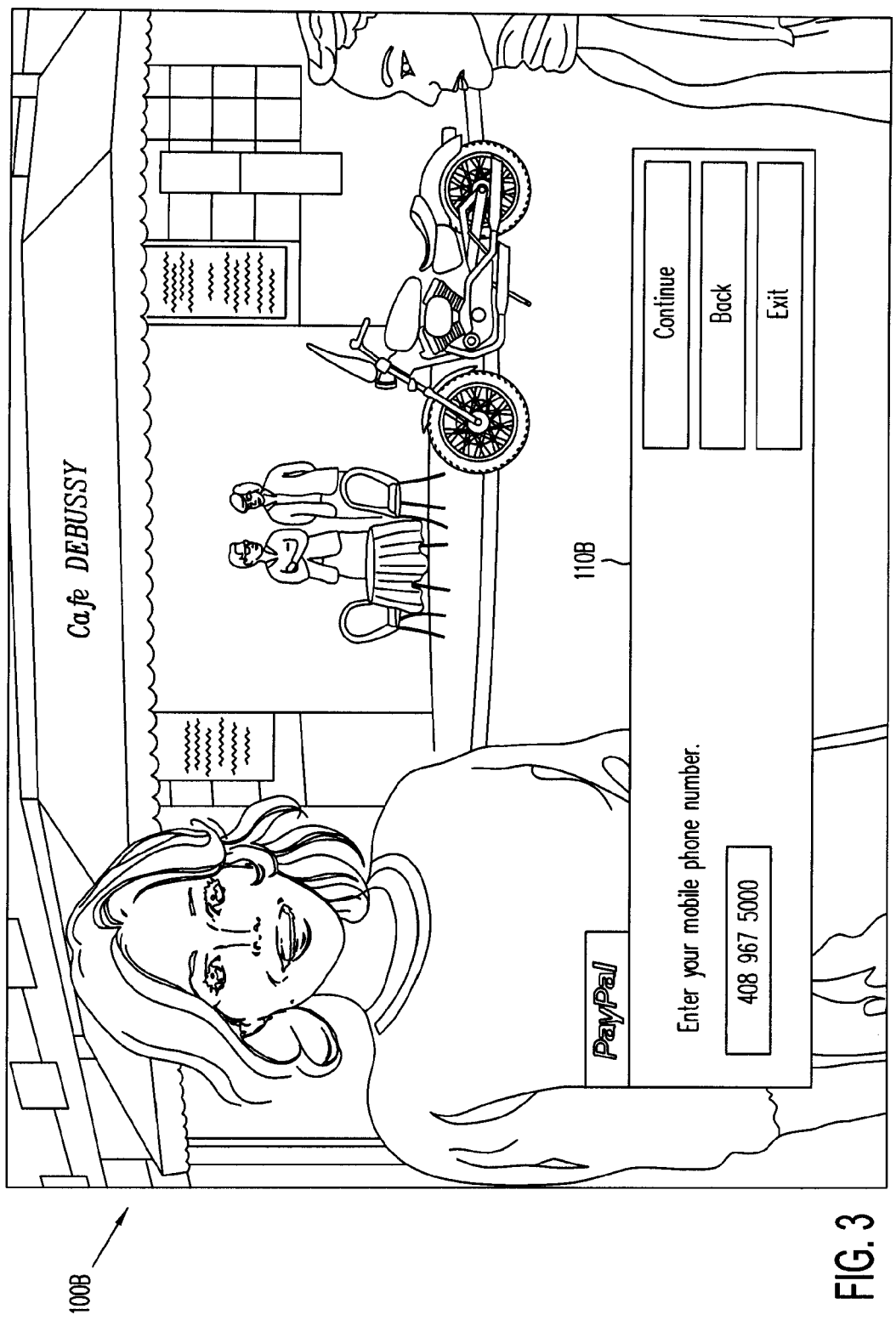

Referring now to FIG. 3, once the consumer chooses to pay with the third party payment provider, an example user interface 100B is displayed to the consumer, in which the consumer is prompted to enter suitable identification information associated with his account with the third party payment provider. In the embodiment illustrated in FIG. 3, the user interface 100B contains a text box 110B that prompts the consumer to enter a mobile telephone number that is linked to his third party payment provider account. In some embodiments, the consumer may enter the mobile telephone number through a suitable mechanism such as a TV remote.

Figure 4:
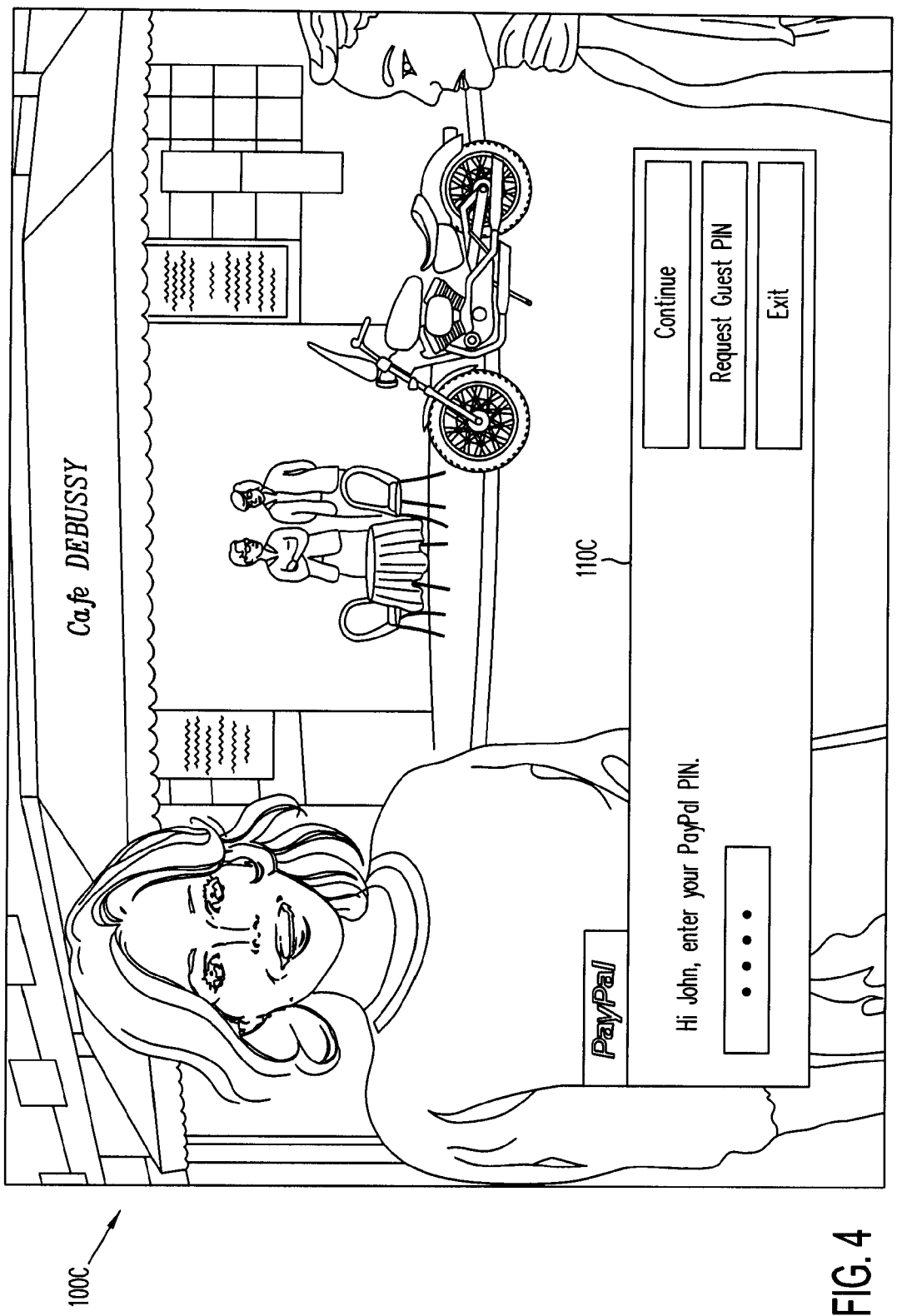

Referring now to FIG. 4, after the consumer inputs his mobile telephone number, an example user interface 100C is displayed to the consumer. In this case, it has been verified that the mobile telephone number that the consumer has entered does match a telephone number for an existing user in the third party payment provider's system. Consequently, the user interface 100C displays a text box 110C that prompts the consumer to enter a secret code or a PIN associated with the correct user. For example, the secret code or PIN may be a multi-digit number.

Figure 5:
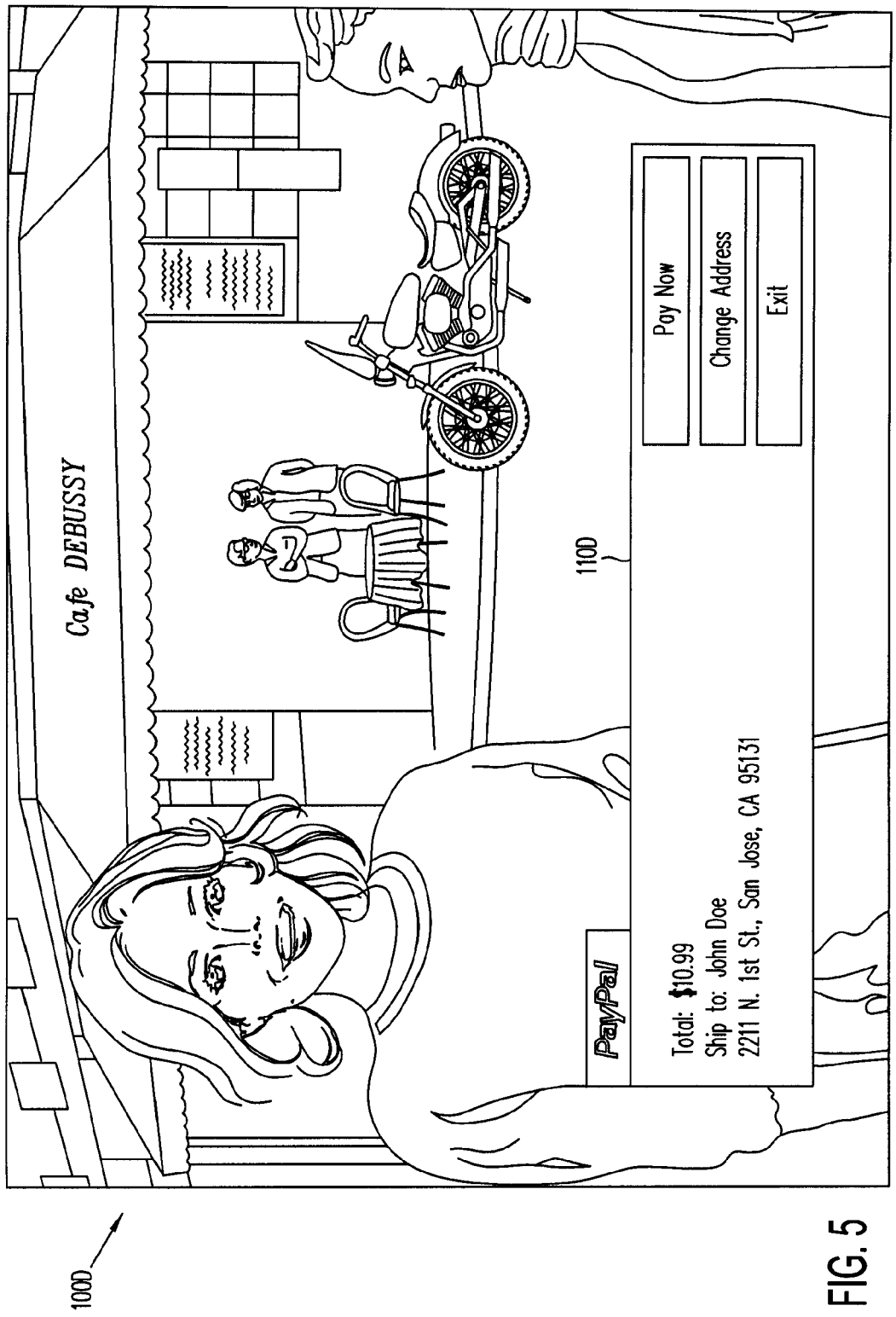

Referring now to FIG. 5, the consumer has entered the correct secret code or PIN and has been successfully verified, and he is now considered "logged-in" to the system. It is understood that in some embodiments, the consumer may also log in to the system using an email address and a password, rather than the mobile phone number and a PIN. The consumer may be given the option to choose a preferred login method. For reasons of simplicity, the user interfaces pertaining to the email/password login method is not illustrated herein. Regardless of which method the consumer chooses to log in to the system, once he has been correctly verified, an example user interface 100D then displays a text box 110D to the consumer. The text box 110D may contain details regarding the transaction, such as the amount total of the purchase and/or the shipping address of the purchaser. The text box 110D may also allow the consumer to change the shipping address.

Figure 6:
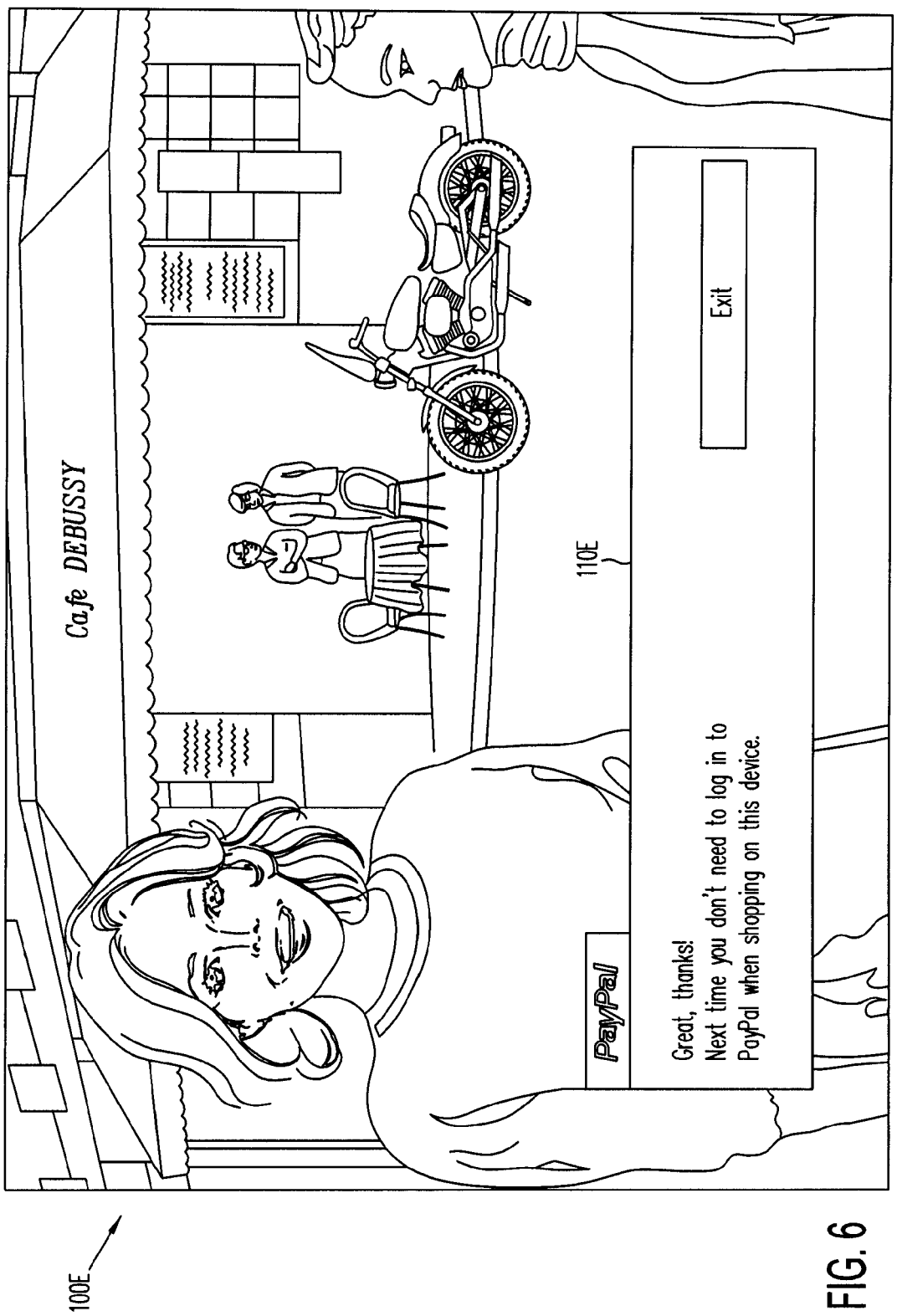
Figure 7:
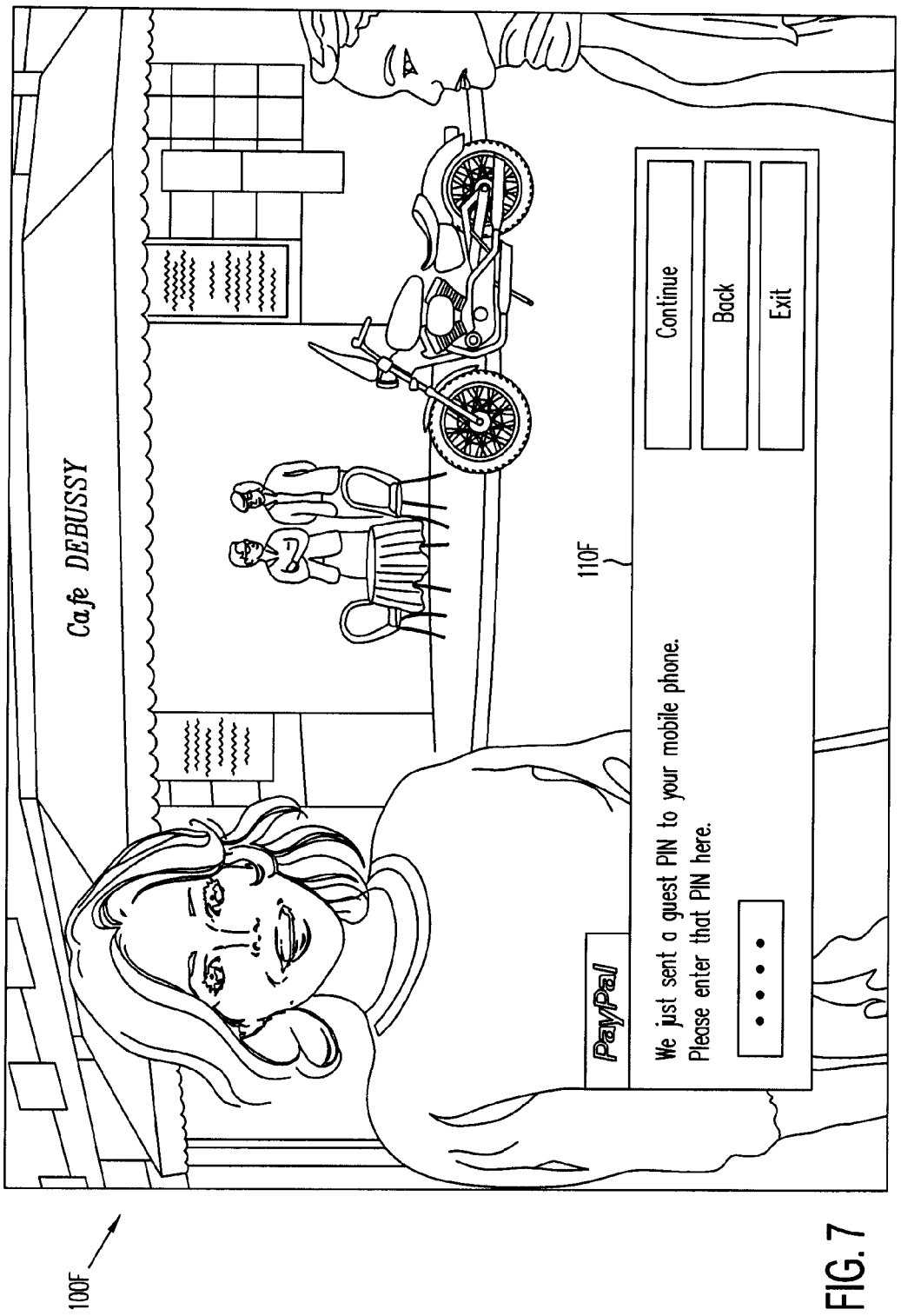

Referring now to FIG. 6, once the consumer confirms that all the purchasing information is correct and follows through with the purchase, an example user interface 100E is then displayed to the consumer. The example user interface 100E includes a text box 110E that informs the consumer that the transaction is successful and that the consumer need not login to the third party payment platform for subsequent purchases.

The text box 110E may also optionally inform the consumer that an electronic confirmation (such as an email confirmation) regarding the purchase may be sent to the consumer soon.

As discussed above with reference to FIG. 1, if the consumer does not have an account with the third party payment provider and does not wish to register for an account, he may be given a temporary guest login to complete the transaction. An example of this situation is graphically illustrated in FIG. 7, in which a user interface 100F displays a text box 110F to the consumer. The text box 110F may inform the consumer that a guest PIN or temporary secret code has been sent to the consumer's mobile phone (or email address), and the consumer is prompted to enter that guest PIN. Once the correct PIN is entered, the purchasing transaction may resume in a similar manner as discussed above with reference to FIGS. 5-6.

Figure 8:
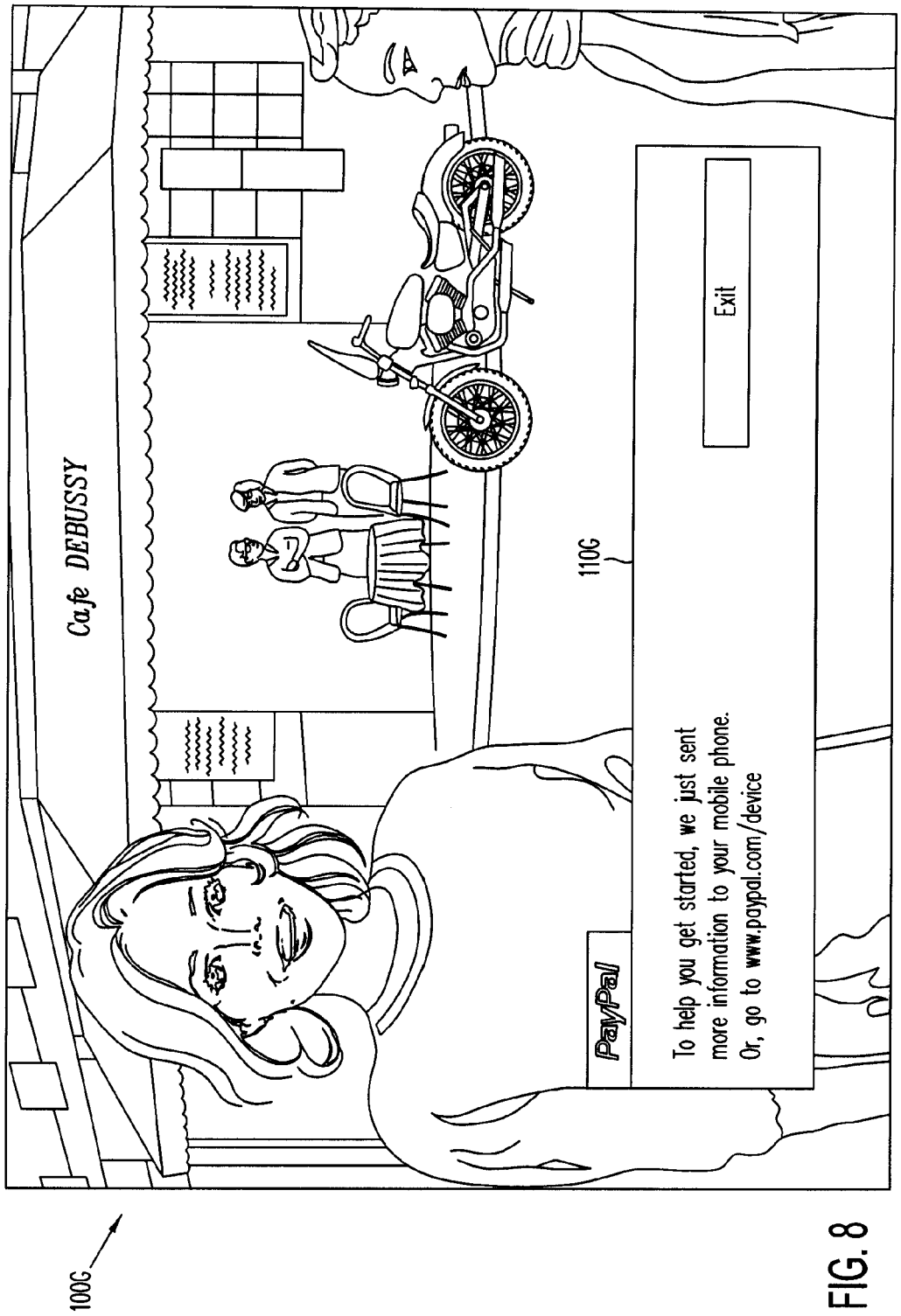
Figure 9:
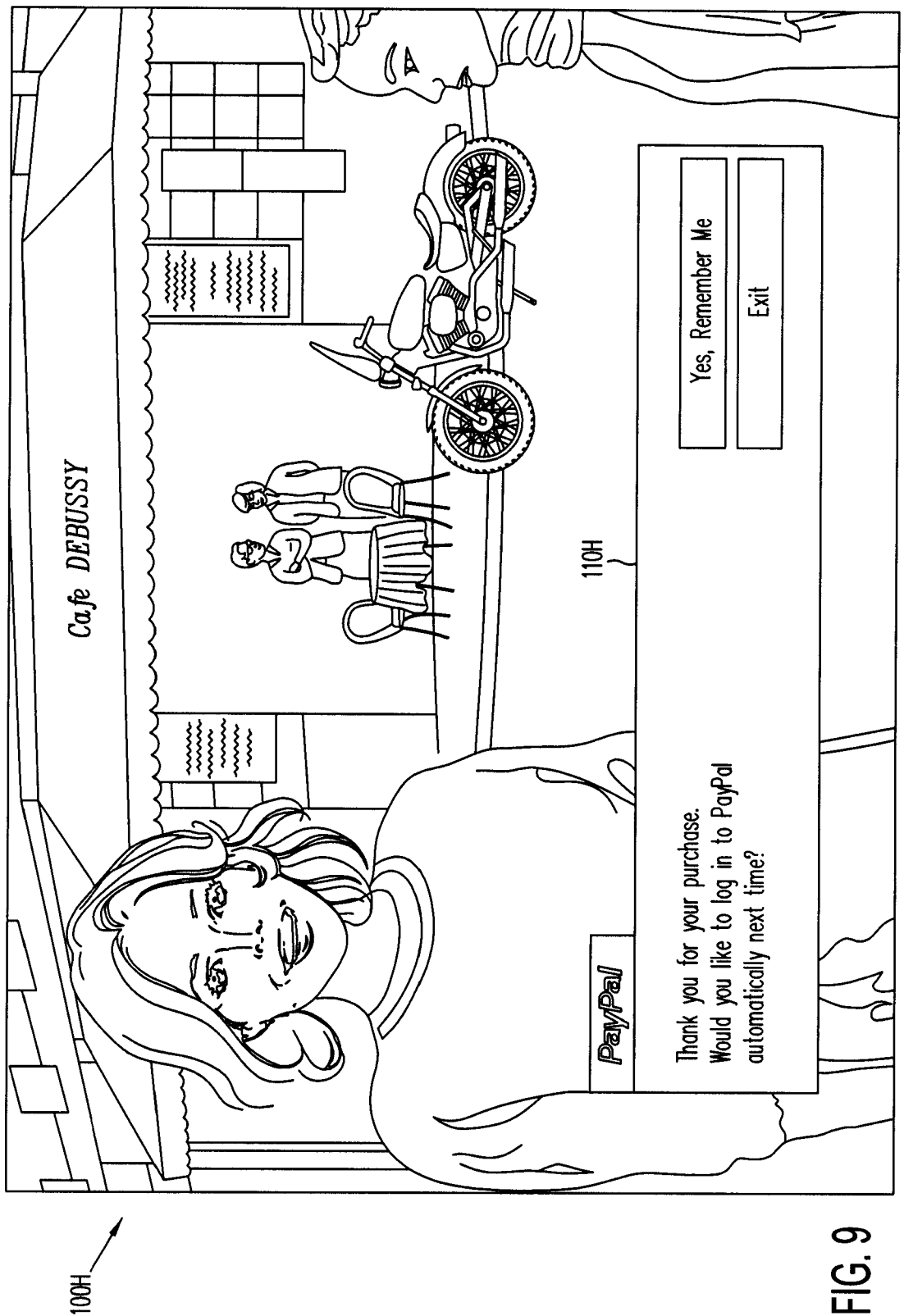

On the other hand, if the consumer does not have an account with the third party payment provider but is ready to register for an account, an example user interface 100G may be displayed to the consumer, as illustrated in FIG. 8. The user interface 100G may include a text box 110G that informs the consumer that additional account signup information has been sent to his mobile phone or email address. In addition, the consumer may also visit a website of the third party payment provider in order to sign up for an account.

Also as discussed above with reference to FIG. 1, the consumer may be given an option to log in to the third party payment provider automatically for the subsequent purchases. This aspect of the present disclosure is graphically illustrated in FIG. 9, which asks the consumer such question in a text box 110H. If the consumer chooses yes, then he no long needs to perform a login to the third party payment provider every time. Instead, his login information will be "remembered" for subsequent purchases.

Figure 10:
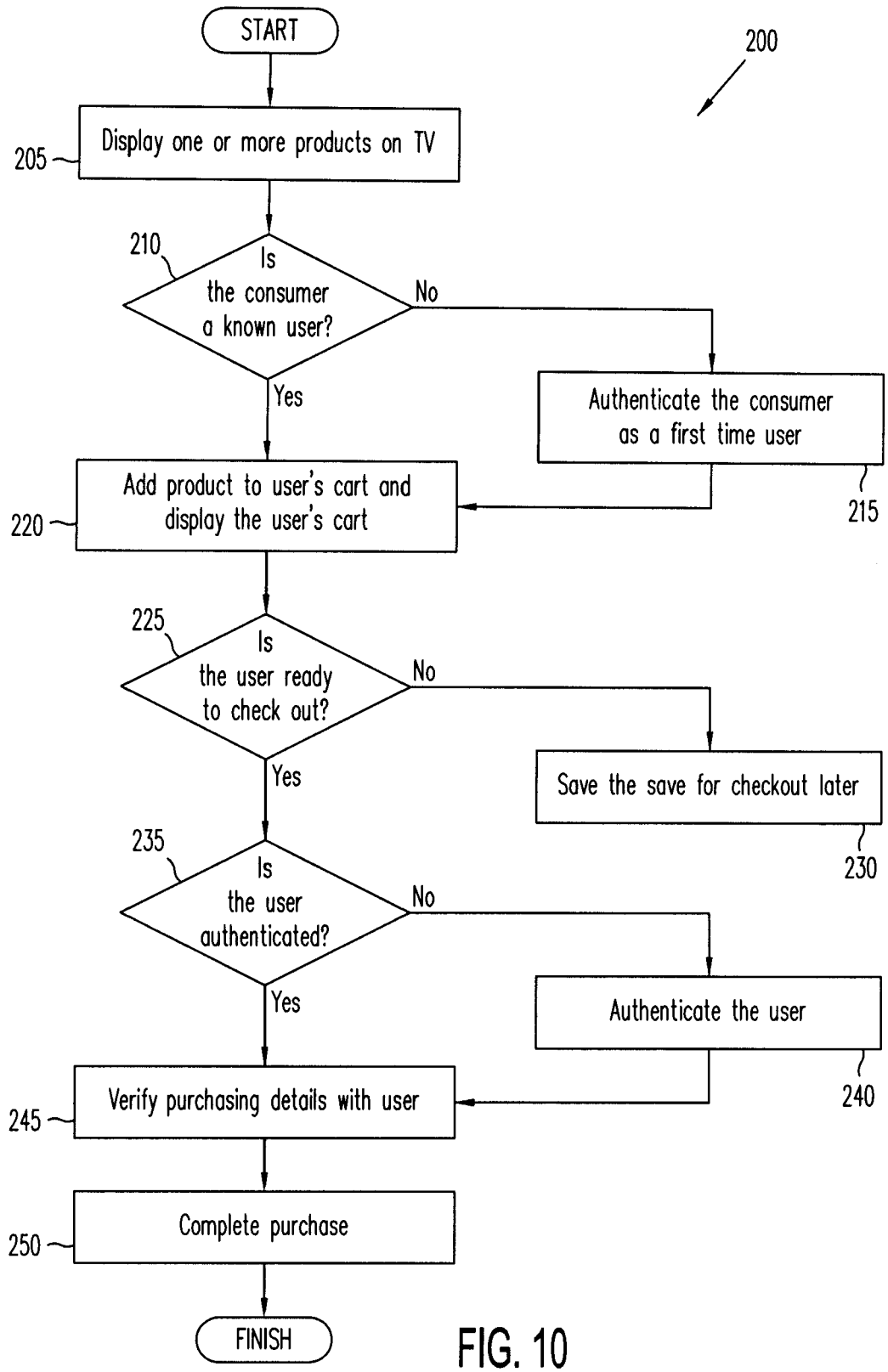
FIG. 10 illustrates an example flowchart for performing a transaction according to various aspects of the present disclosure.

The discussions above pertain to the purchase of a single item as an example. According to the various aspects of the present disclosure, the consumer may indeed purchase multiple products in the same transaction. FIG. 10 is a flowchart of a method 200 that illustrates an example process flow for performing a purchasing transaction involving multiple products.

Referring to FIG. 10, the method 200 includes a step 205, in which one or more products are displayed on TV. This step is similar to the step 25 of FIG. 1. For example, as a live TV program is being displayed to the consumer, the consumer is notified that a product may be available. The product may be associated with or embedded as an element within the TV program.

The method 200 continues with a decision step 210 to determine whether or not the consumer is a known user once the consumer decides to purchase the product. In some embodiments, the consumer may add the product to a virtual or digital "shopping cart." As the consumer performs this transaction, the method 200 will determine if the consumer is a known user (e.g., a consumer who has been authenticated previously) or is a new user. If the answer from the decision step is no—meaning the user has not been previously authenticated—then the method proceeds to a step 215 to authenticate the consumer. The execution of the step 215 may involve substantially similar processes as those discussed above with reference to FIG. 1, where a consumer is authenticated for the first time.

On the other hand, if the decision step confirms that the consumer had already been authenticated as a known user for the third party payment provider, the method 200 proceeds to step 220, in which the product selected by the consumer/user is added to his digital shopping cart. The cart may or may not include other products previously selected and added to the cart by the consumer. In some embodiments, the products in the cart may be displayed as a list, and the consumer may be able to scroll up and down the list to view the details of each product. The consumer may also be given the option to edit the cart, for example changing the quantity of each item in the cart.

The method 200 then proceeds to a decision step 225 to determine if the consumer is ready to check out. If the answer is no, the method 200 then proceeds to a step 230, in which the products in the cart are saved for a later checkout, and the consumer may resume watching the TV program. If the decision step 225 determines that the consumer is ready to check out, the method 200 proceeds to a decision step 225 to determine if the consumer has been authenticated. If the answer is no, the method 200 proceeds to a step 240 in which the consumer is authenticated in a procedure similar to that discussed above with reference to FIG. 1. For example, the consumer may be authenticated using a mobile phone number and a PIN linked to the third party payment provider account, or using the correct combination of a username and a password.

If the consumer had already been authenticated (or after the consumer finishes the authenticated process in step 240), the method 200 proceeds to a step 245, in which the purchasing details are verified with the user. For example, the consumer may be prompted to confirm that the quantity and price of the products in the cart are correct, and/or that his shipping address is correct. After the consumer confirms the purchasing details, the method 200 proceeds to a step 250 to complete the purchase.

The method 200 discussed above merely illustrates an example process flow and is not intended to be limiting, and additional steps may be performed before, during, or after the steps 205-250 of the method 200. To facilitate a better understanding of the various aspects of the method 200, FIGS. 11-15 are provided to graphically illustrate some embodiments of the method 200.

Figure 11:
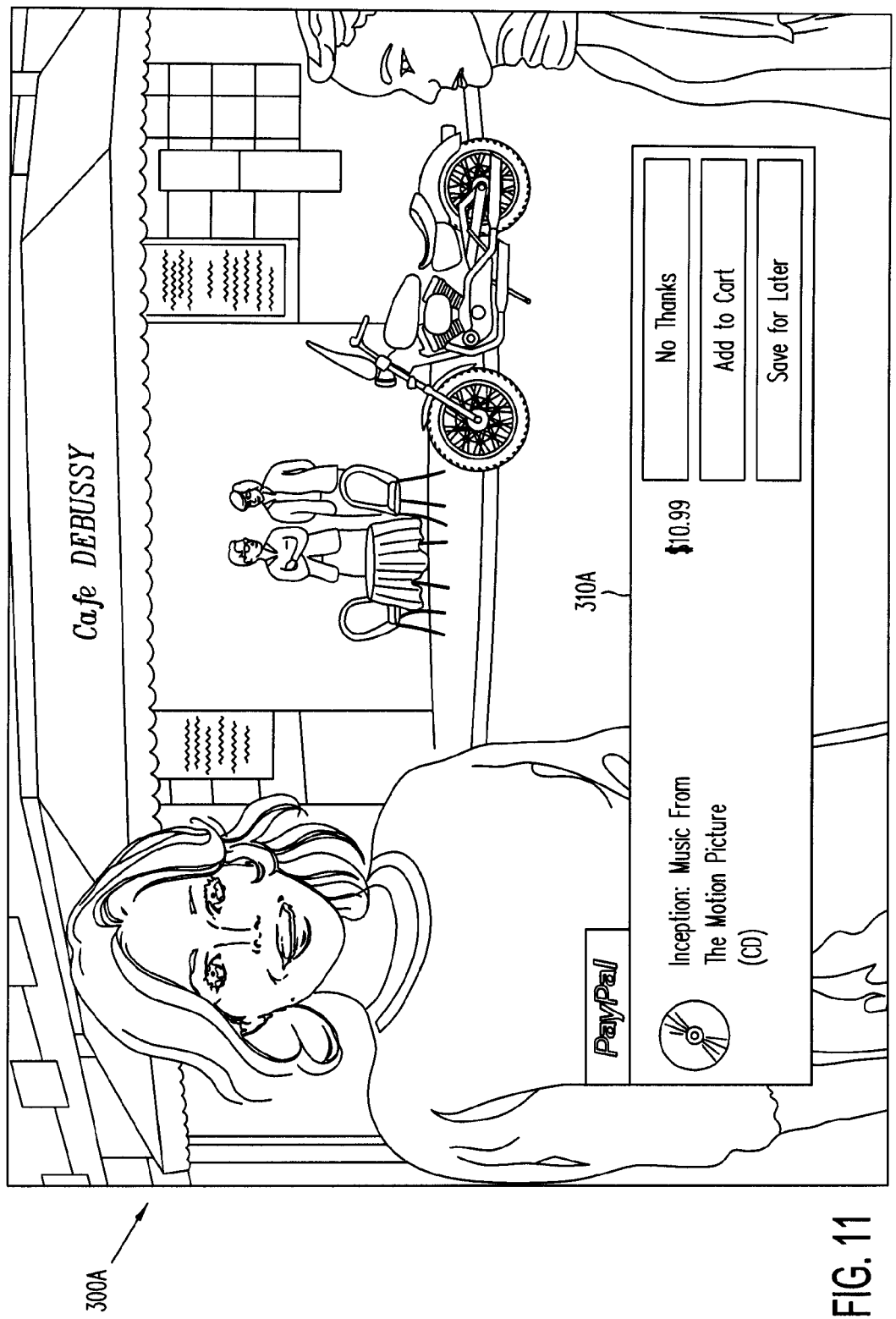
FIGS. 11-15 illustrate example user interfaces for conducting a transaction through a television according to various aspects of the present disclosure.

Referring to FIG. 11, an example user interface 300A is displayed. The user interface 300A is similar to the user interface 100A of FIG. 2. For example, it may be a screenshot of a TV program that the consumer is watching. And similarly, an offer may be communicated to the consumer at various points of the TV program. The offer may be displayed as a text box (or a dialog box) 310A, which contains a brief description of the product being offered. The text box 310A gives the consumer an option to add the product to a digital or virtual shopping cart or save it for a later purchase.

Figure 12:
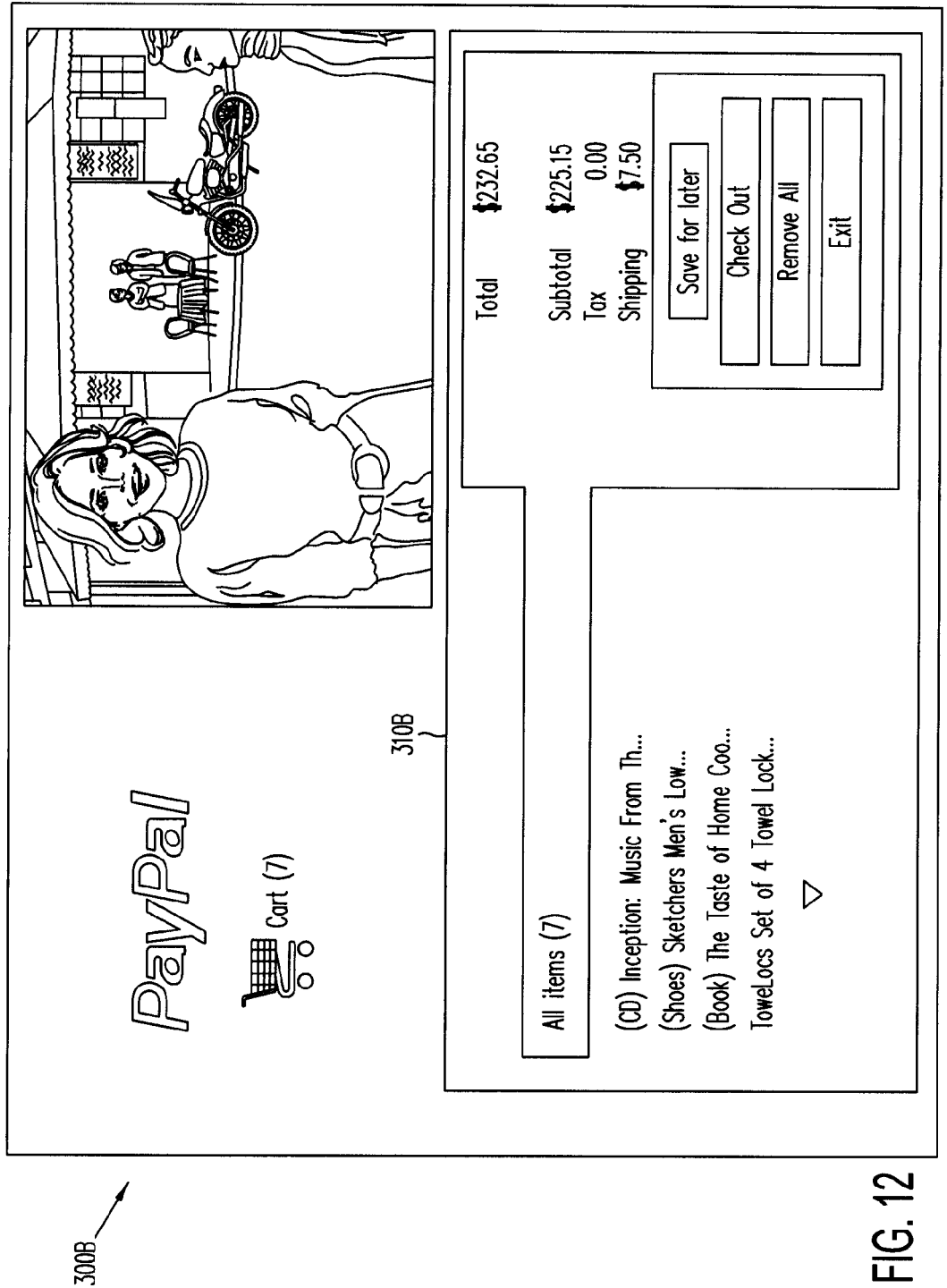

Referring now to FIG. 12, an example user interface 300B is displayed to the consumer after the consumer adds the product to the cart. The user interface 300B shows a text box 310B, in which the consumer's shopping cart is displayed. The consumer may be able to scroll through the shopping cart to view the details associated with each item in the cart. In some embodiments, the consumer may be able to edit the shopping cart, such as changing the quantity of the items in the cart. The consumer can initiate the checkout process, or alternatively save one or more items in the cart for a later purchase.

Figure 13:
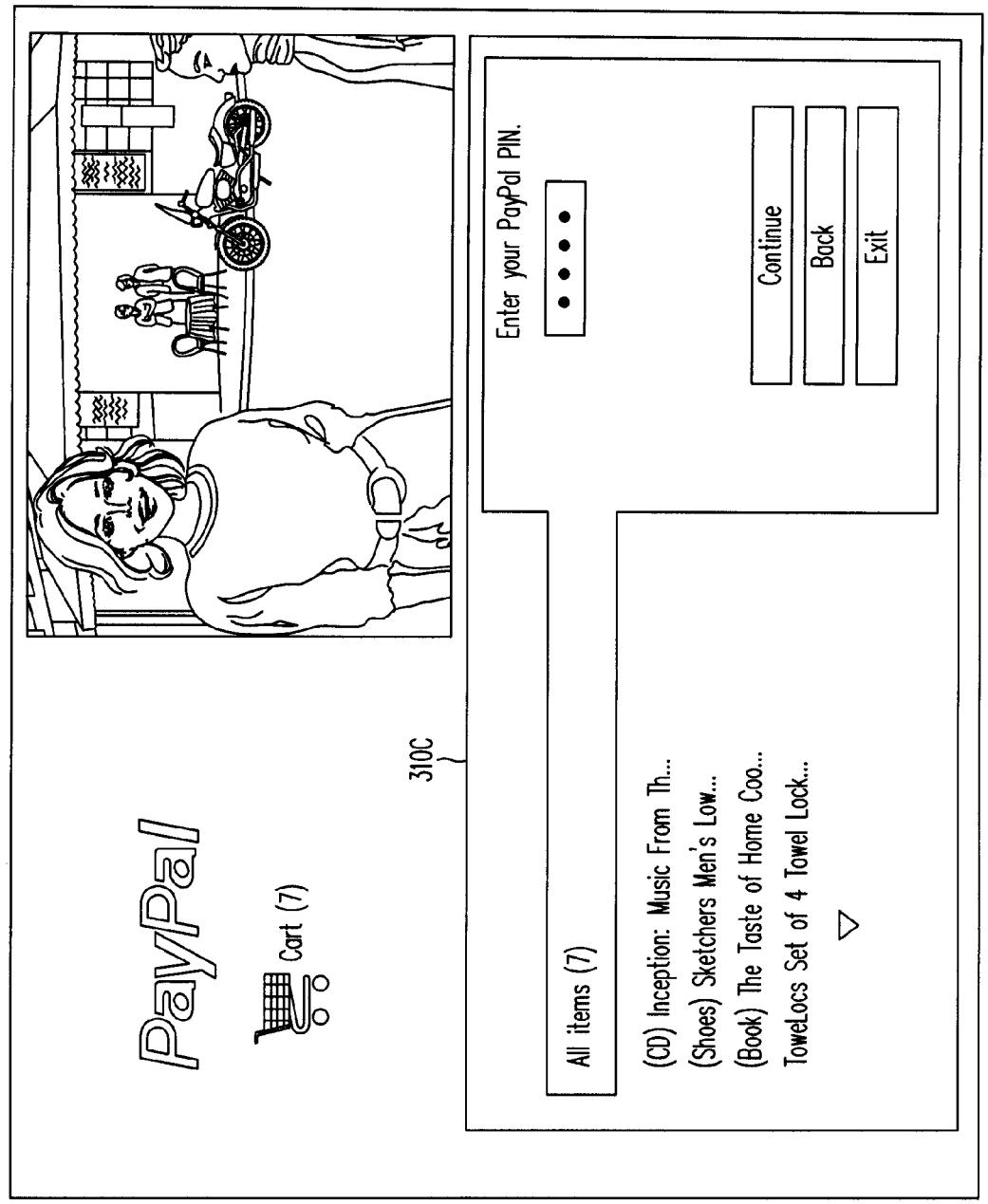

Referring now to FIG. 13, as the consumer initiates the checkout process, an example user interface 300C is displayed. The user interface 300C includes a text box 310C that prompts the consumer to enter his login information for a third party payment provider. In some embodiments, the consumer can choose to enter a mobile number and a PIN to authenticate himself. In other embodiments, the consumer can choose to enter a username and a password to authenticate himself.

Figure 14:
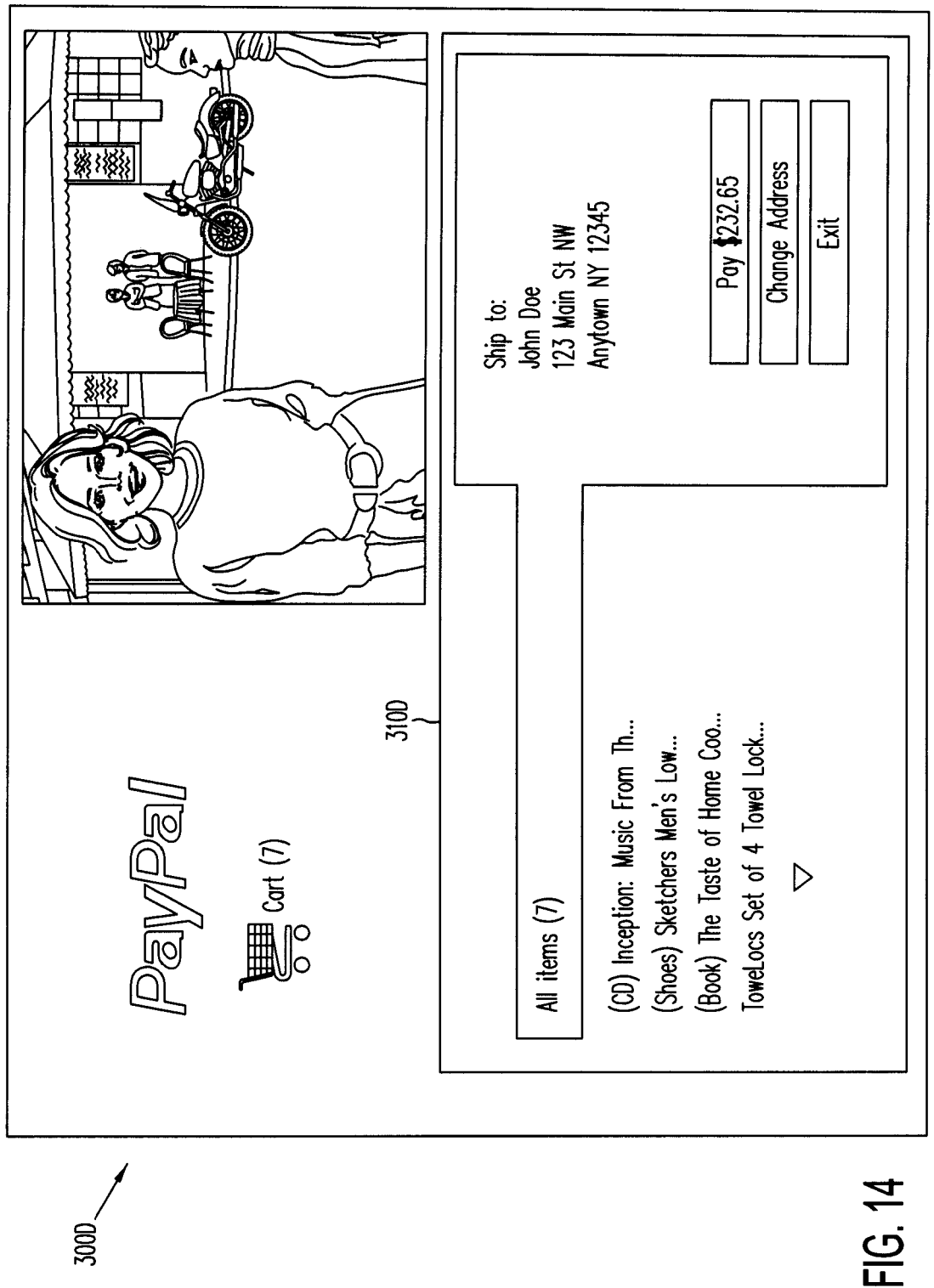
Figure 15:
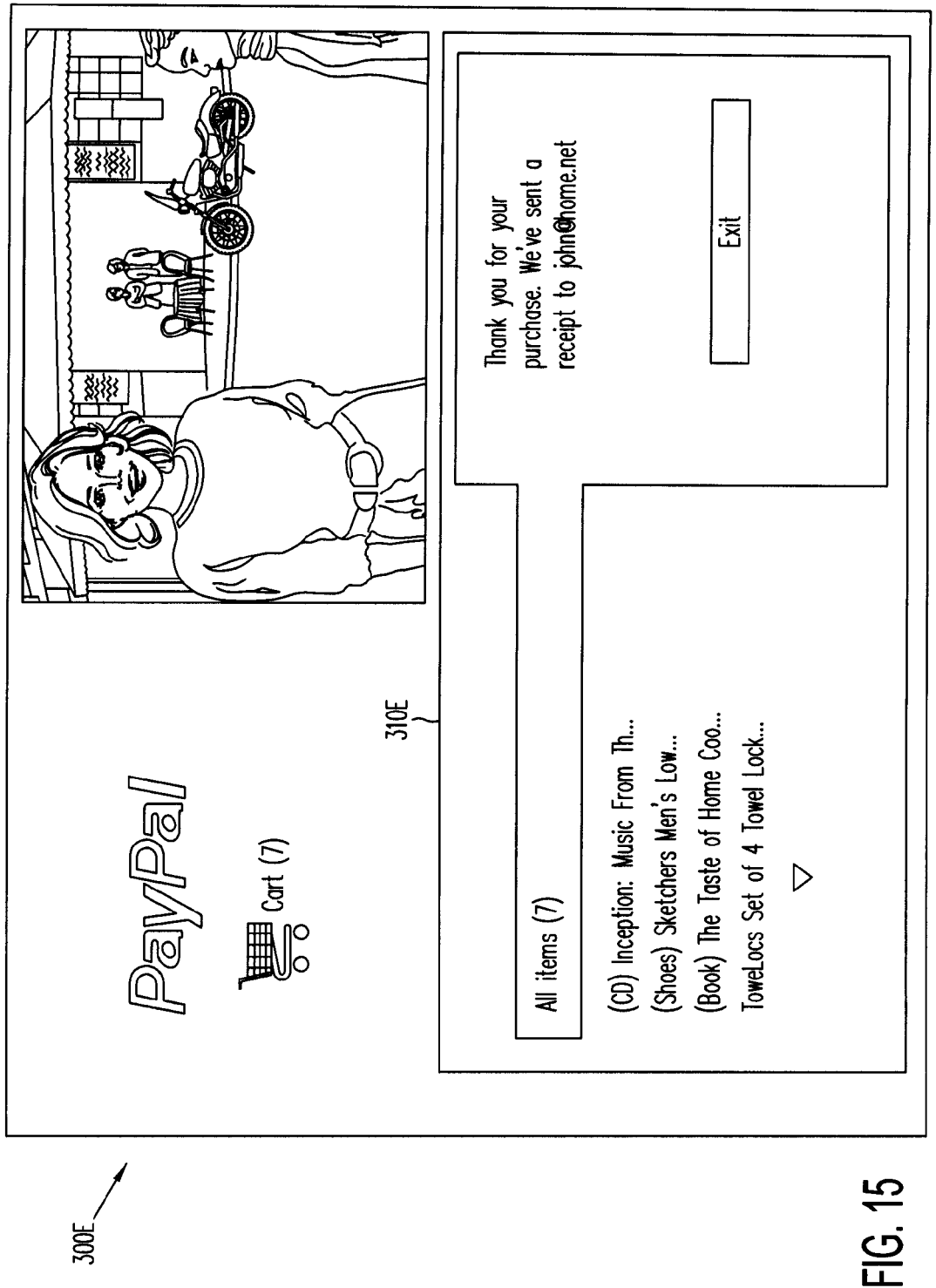

Referring now to FIG. 14, the transaction details are displayed to the consumer in a text box 310D in an example user interface 300D. The consumer is asked to verify details such as the consumer's shipping address and/or the price/quantity in the cart. Thereafter, in FIG. 15, an example user interface 300E includes a text box 310E that displays a confirmation for the purchasing transaction.

In all the above examples, the consumer may interact with the TV (for example selecting different options or inputting text) in a variety of ways. In some embodiments, the consumer may use a remote control to perform the transaction. In other embodiments, the consumer may use a gesture-based mechanism to perform the transaction. The gesture-based mechanism may include a sensor device coupled to the TV, where the sensor device can detect gestures or physical movements of the consumer and interpret the corresponding meaning of the gestures. For example, a particular hand waving motion may correspond to an "enter" or "yes" command, while a different hand waving motion may correspond to a "cancel" or "no" command. In yet other embodiments, the TV screen itself may be touch-sensitive, so that the user can interact with the TV set through the touch-sensitive controls.

Compared to conventional shopping experiences, the purchasing scheme described above offers the consumers greater flexibility and a more interactive shopping experience. For example, the products can be offered to the consumer throughout a TV program that the consumer is watching. If the consumer is interested in a product, he need not leave his couch (or bed) and go make a phone call or log online to contact the merchant. Rather, he can browse through the available products and make a purchase while he is watching the TV program. Of course, the user may have the option to pause the TV program as he is making the purchase. The user may also choose to configure the notification icon of a product availability to be unobtrusive so as to not diminish his TV viewing experience. In addition, the TV program containing offers may or may not be live. The consumer may still interact with the TV the same way even if the TV program is on tape delay or is a digitally pre-recorded program.

Moreover, while the consumer may initiate and complete the purchase through a TV, he is not required to do so. In some embodiments, the consumer may just manipulate his third party payment shopping cart (e.g., add or delete items to his cart) by interacting with the TV, and he can finish the checkout process on any computing device later, for example after he has finished watching the TV program. Stated differently, the consumer can initiate a commercial transaction through TV, but he is not necessarily required to finish that commercial transaction through TV.

Furthermore, since the products being offered are integrated into (or embedded within) the TV program (e.g., an article of clothing worn by the lead actress or a car driven by the actor), the product is discretely and yet efficiently advertised to the consumer. As such, the consumer may be able to better gauge his interest level of the product. For example, the consumer might decide that the dress or jewelry worn by the actress would look very good on his wife, or that the soundtrack from the movie is really enjoyable. Because the consumer can more accurately gauge his interest level in the product, and because he can make a purchase instantly using the TV, the consumer is more likely to follow through with the purchase. Hence, the type of advertising platform discussed above not only offers convenience to the consumers, but also offers advantages to merchants as well.

The discussions above have used an example of a single user conducting a transaction securely through a TV. However, a single user case is merely one of many example scenarios according to various aspects of the present disclosure, and some additional multi-user scenarios are briefly discussed below.

In one multi-user scenario, a father logs into his XBOX® account and decides to make a purchase in the XBOX market place. The father chooses a sports game that he would like to play with his son over the weekend. On a payment option screen, he may select to pay with a third party provider, with which he has an account. This may be the first time that the father is using his third party payment provider account in the XBOX marketplace. After the father enters his security credentials to log in the third party payment provider, he is given an option to add an account for other eligible users. The father may then set up an account for his son and enters the required information for his son's account. The father can then fund his son's account after it is set up. Thereafter, the son may make purchases from the XBOX marketplace using the balance in his new account with the third party payment provider. The son may also make purchases through the TV in the interactive manner described above.

In another multi-user scenario, user A and user B are roommates living together and thus share the same TV (though the TV may be owned by either the user A or the user B). Suppose that while watching a TV program together, the user A sees a product that she would like to purchase but is not sure as to how to conduct the purchasing transaction. The user A asks the user B to make the purchase for her. The user B initiates the transaction using the third party payment provider, and during the login process, the user B is given an option to "switch users." By choosing this option, a mobile phone number for the user A may be entered. If the user A does not have an account with the third party payment provider, the TV will display a notification message indicating that a message has been sent to the user A's phone. The user A may then set up her account with the third party payment provider, which may be done using any suitable computing device. Thereafter, both the users A and B may conduct purchasing transactions interactively through the TV in the manner described above. During the purchasing transaction, the users A and B may switch back and forth between their third party payment provider accounts, depending on who is making the purchase.

Figure 16:
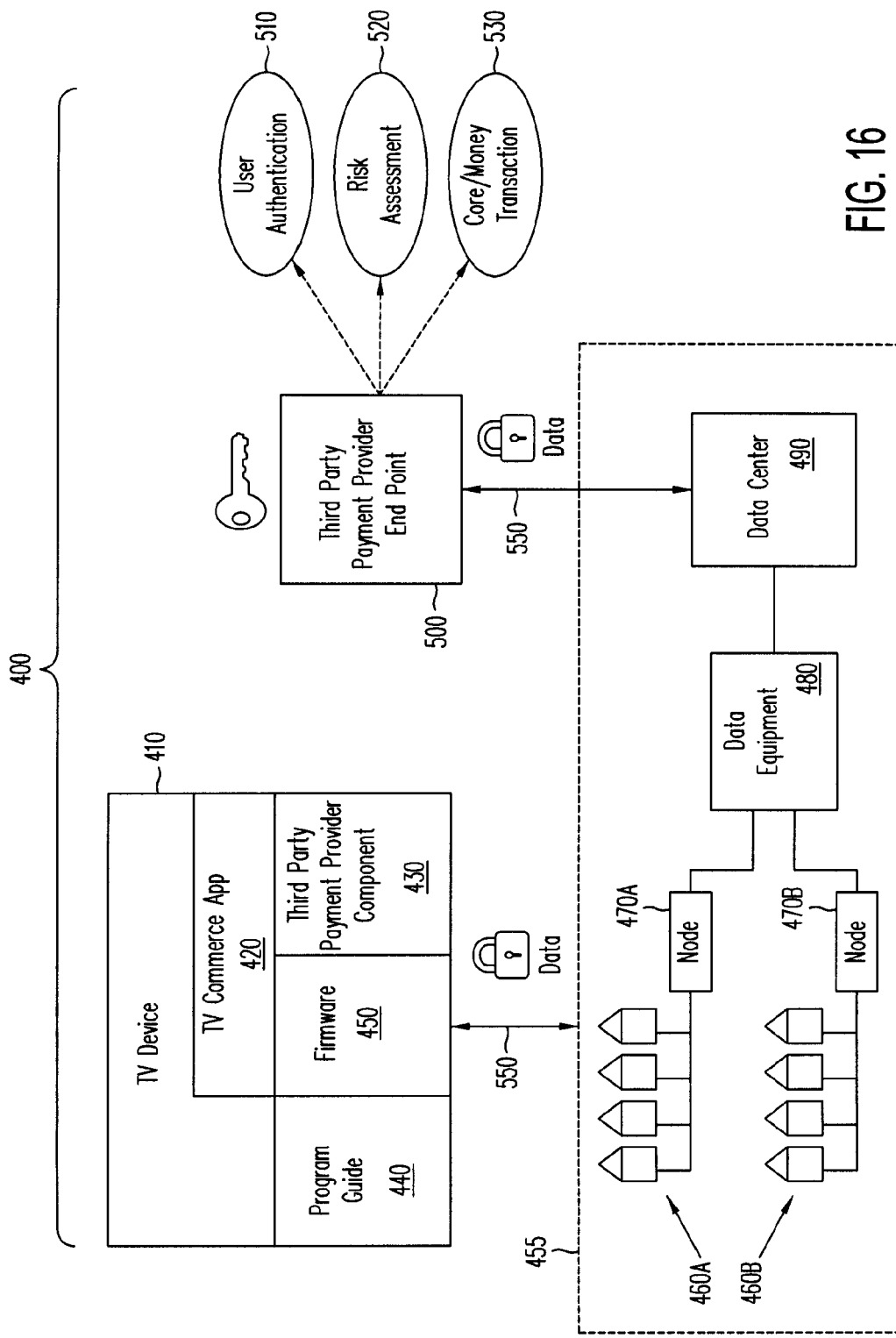
FIGS. 16-17 illustrate example media infrastructures for enabling the conducting the transactions through a television according to various aspects of the present disclosure.

The infrastructure of implementing the interactive shopping through a TV will now be described. Referring to FIG. 16, a simplified block diagram of a media infrastructure 400 is illustrated. The media infrastructure 400 includes a TV device 410. The TV device 410 may include a television set, which may be an analog TV set or a digital TV set. The TV device 410 may also include a set-top box (STB).

The TV device 410 includes software (e.g., STB software) that supports various applications. Examples of STB software include applications based on an Enhanced TV Binary Interchange Format specification (EBIF). EBIF is a multimedia content format defined by a specification developed under the OpenCable project. The primary purpose of the EBIF content format is to represent an optimized collection of widget and byte code specifications that define one or more multimedia pages, similar to web pages, but specialized for use within an enhanced television or interactive television system. An EBIF resource (file), i.e., a sequence of bytes that conforms to the EBIF content format, forms the primary information contained in an ETV Application. An ETV User Agent acquires, decodes, presents (widgets), and executes (actions) contained in an EBIF resource in order to present a multimedia page to an end-user.

Of course, EBIF is just one of the many ways that can enable the media infrastructure 400. Other standards or specifications may also be used to enable an interactive TV infrastructure.

In the embodiment illustrated in FIG. 16, a TV commerce app 420 is implemented as software on the TV device 410. The TV commerce app 420 may pertain to one or more specific merchants. In some embodiments, the TV commerce app 420 comes pre-installed on the TV device 410. In other embodiments, the user of the TV device 410 may install the TV commerce app 420 after the TV device 410 has been purchased and installed. The TV commerce app 420 may be invoked when the TV is displaying a TV program. For example, as a video stream comes through the TV device 410, there may be one or more trigger points embedded in the video stream. These trigger points may be capable of invoking one or more specific TV commerce apps such as the TV commerce app 420.

A third party payment provider component 430 is also implemented as software on the TV device 410. The third party payment provider component 430 will handle security tasks such as verifying username and passwords or PINs (or the temporary login information) entered by the user. The third party payment provider component 430 can also handle user presentation. The third party payment provider component 430 communicates securely with the third party payment provider. For example, the third party payment provider component 430 may encrypt the communication taking place between itself and external devices. In some embodiments, the third party payment provider and a vendor for the TV device 410 may agree on public keys bundled with a library of the third party payment provider. The third party payment provider component 430 interacts with device specific intelligence and collects device data.

In some embodiments, the third party payment provider component 430 includes a front end component that resides on a TV set and a back end component that resides on a set top box. The front end component is configured for direct interaction with the user. For example, the front end component may display the various user interfaces discussed above in association with FIG. 2-9 or 11-15. The front end component may instruct the TV set to display a text box of 300 pixels by 500 pixels, with the texts being a certain font. The back end component is a lower level component and handles tasks such as encryption algorithms and encryption keys. In some embodiments, the back end component includes a library, for example an EBIF library. The user may interact with the front end component, and the front end component communicates with the back end component, and the back end component communicates with a third party payment provider server discussed later.

Similar to the TV commerce app 420, the third party payment provider component 430 may also be pre-installed on the TV device 410 or may be installed on the TV device 410 afterwards. The third party payment provider component 430 interacts with the TV commerce app 420 to facilitate an interactive commercial transaction through TV as discussed above.

The TV device 410 may also contain a program guide app 440 and firmware 450. The program guide app 440 is shown herein to illustrate the internal workings of a cable set top box. The firmware 450 is a component that exists in many set top boxes and that controls the communication and other functions of the set top box. The firmware 450 may interact with the third party payment provider component 430 in order to perform certain tasks of the set top box.

The media infrastructure 400 includes a network 455. In the embodiment illustrated in FIG. 16, the network 455 is a cable TV network. The cable TV network 455 includes a plurality of homes 460. A TV device like the TV device 410 may be implemented inside each of the homes 460. The homes 460 may be divided into different groups, where the homes in each group share a common node 470. For example, as illustrated in FIG. 16, a subset of the homes 460A may be connected to a node 470A through common cabling, while a different subset of the homes 460B may be connected to a node 470B through common cabling.

In a hierarchical manner, a group of the nodes 470 are then connected to a data equipment 480. The data equipment 480 is then connected to a data center 490. Data communication may take place between the nodes 470 and the data equipment 480, and between the data equipment 480 and the data center 490. The data center 490 may generate media content or media programs by itself, or may receive media programs generated by a media provider (not illustrated herein) and relay the media programs to the TV device 410, which is done through the data equipment 480, the node 470A, and the homes 460A. The nodes 470, the data equipment 480, and the data center 490 may contain suitable machines or equipment for carrying or delivering the media content. For example, the nodes 470 may include multiplexers for multiplexing or consolidating signals. The data equipment 480 and the data center 490 may include may include computer servers for processing signals.

The cable TV network 455 serves as a "bridge" for connecting the TV device 410 to the Internet, since the TV device 410 itself otherwise lacks Internet connection capabilities. It is also understood that other types of networks may also be used to provide Internet access to the TV device 410. For example, a satellite TV network may be used in place of the cable TV network 455. The satellite TV network may include appropriate equipment such as satellite dishes, transmitters, receivers, etc. Other alternative networks (such as IPTV networks) may also be implemented, but they are not discussed in detail herein for reasons of simplicity.

In the embodiment illustrated in FIG. 16, the data center 490 communicates with a third party payment provider end point 500. In some embodiments, the third party payment provider end point 500 includes an application programming interface (API) system built with intelligence to understand what device(s) is interacting with it. Based on the device data and type, the third party payment provider end point 500 will present users with the appropriate presentation and security challenge. Also based on device data and type, the third party payment provider end point 500 will allow or deny certain types of transaction. The third party payment provider end point 500 may also apply the corresponding risk models/rules based on the device data and type. The third party payment provider end point 500 may include one or more computer or data servers for processing these various tasks.

As examples, the third party payment provider end point 500 includes software modules or software engines such as a user authentication software module 510, a risk assessment software module 520, and a core/money transaction software module 530. The user authentication software module 510 can interact with the third party payment provider component 430 to verify the security credentials entered by a user. The risk assessment software module 520 can monitor the purchasing history of a user and detect anomalous purchases. For example, if the user has never bought any merchandise exceeding 100 dollars, then a supposed purchase of 5,000 dollars may be flagged by the risk assessment software module 520, which can then send an alert to the user and/or appropriate financial institutions. The core/money transaction software module 530 represents a merchant infrastructure in some embodiments. For example, the core/money transaction software module 530 may facilitate the movement and transfer of funds between a merchant and users' accounts.

It is understood that the third party payment provider end point 500 may include a plurality of additional software or hardware modules that are designed and configured to accomplish specific tasks, but they are not discussed herein for reasons of simplicity.

As discussed above, a user may stream media programs to his TV device 410 from a media content or media program provider. For example, the media programs may be streamed from the data center 490, to the data equipment, to the node 470, to the home 460, and then to the TV device 410. In some embodiments, the video stream is an analog video stream. Offer trigger mechanisms are embedded at various points in the analog video stream. For example, the media program may be a commercial for a clothing apparel. The trigger mechanisms communicate with the TV commerce app 420. In some embodiments, the TV commerce app 420 is customized for a specific type of media program, and the TV commerce app actively "listens" for the right trigger mechanism as the media program is being streamed to the TV device 410.

Once a trigger mechanism is identified, the TV commerce app 420 may display a small icon or a larger pop-up window on a viewing screen of the TV device 410, which indicates to the user watching the TV program that an offer to purchase one or more specific types of cloth apparel is available. When the user is ready to make a purchase based on the displayed offer, the TV commerce app 420 interacts with the third party payment provider component 430 to facilitate the transaction. For example, the TV commerce app 420 may request the third party payment provider component 430 to display a login screen overlying the TV program screen itself, so that the user can enter his login credentials (i.e., PIN, username/password, etc) for the third party payment provider.

Data 550—which may contain the user's login credentials and/or other sensitive information such as the user's credit card or bank account numbers—is then sent to the third party payment provider end point 500 for verification. As discussed above, since the TV device 410 itself lacks Internet connectivity, the data 550 is delivered to the third party provider end point 500 through the network 455. In the embodiment illustrated in FIG. 16, the data 550 is routed outside the home 460 (inside which the TV device 410 is located) and travels through the node 470, the data equipment 480, and thereafter the data center 490, before eventually reaching the third party payment provider end point 500. The node 470, the data equipment 480, and the data center 490 may each be referred to as an "intermediate hop," since they are intermediate relay points between the TV device 410 and the third party payment provider end point 500.

When the third party payment provider end point 500 receives the data 550 from the TV device 410, the third party payment provider end point 500 determines whether the credentials entered by the user matches with an existing user's account. If not, the third party payment provider end point 500 may send a message back to the TV device 410 through the network 455 to prompt the user to either re-enter his login information or to register for an account with the third party payment provider end point 500 in case the user has not registered for one yet. If the user credentials are correct, the third party payment provider end point 500 may grant the user's authentication request to log in to the server of the third party payment provider end point 500. The third party payment provider end point 500 may then send the TV device 410 data 550 that contains an authentication permission. For example, the authentication permission may include an authentication token. The authentication token allows the user operating the TV device 410 to gain access to the third party payment provider end point 500, but may impose limitations on such access. For example, the authentication token may restrict such access to a specific time period or other session related elements, or even for a specific device type.

After the user has been authenticated, the third party payment provider component 430 may also display a user authorization screen to collect the user's authorization for the purchasing transaction. The relevant request is sent to the third party payment provider end point 500, along with the authentication token. The third party payment provider end point 500 may respond back with an authorization token. The third party payment provider component (specifically, the back end component) may then make a request (along with the authorization token) to the third party payment provider end point 500 to execute the payment Thus, it can be seen that the communication between the TV device 410 and the third party payment provider end point 500 is a two-way communication, as each entity may send and receive data 550 from the other. As discussed above, such data is delivered through the intermediate hops of the network 455. Due to these intermediate hops, high levels of security measures will be taken to ensure that the data 550 is not compromised while it is in transit from the TV device 410 to the third party payment provider end point 500, or vice versa. In various embodiments, these security measures include channel encryption and/or message encryption. Also, in certain embodiments, the communication between the data center 490 and the third party payment provider end point 500 is based on client mutual authentication, for example through a Secure Sockets Layer (SSL) handshake, so as to authenticate the data center. Also because of the intermediate hops, the third party payment provider end point 500 will possess intelligence to know the specific route taken by the data 550 to reach the third party payment provider end point 500.

Based on the discussions above, it can be seen that one aspect of the media infrastructure 400 involves implementing a secure digital technology component on a TV device (which may includes a set top box), and enabling the digital technology component to securely communicate with a server on the Internet. The communication takes place by propagating data through a network with intermediate hops without any of the intermediate hops "looking side" or inspecting the data. Stated differently, the intermediate hops of the network merely forwards the data to its next destination. In various embodiments, the secure digital technology component is the third party payment provider component 430 (which may contain Internet-related security mechanisms), whereas the intermediate hops of the network include the nodes 470, the data equipment 480, and the data center 490 when the network is a cable TV network.

Figure 17:
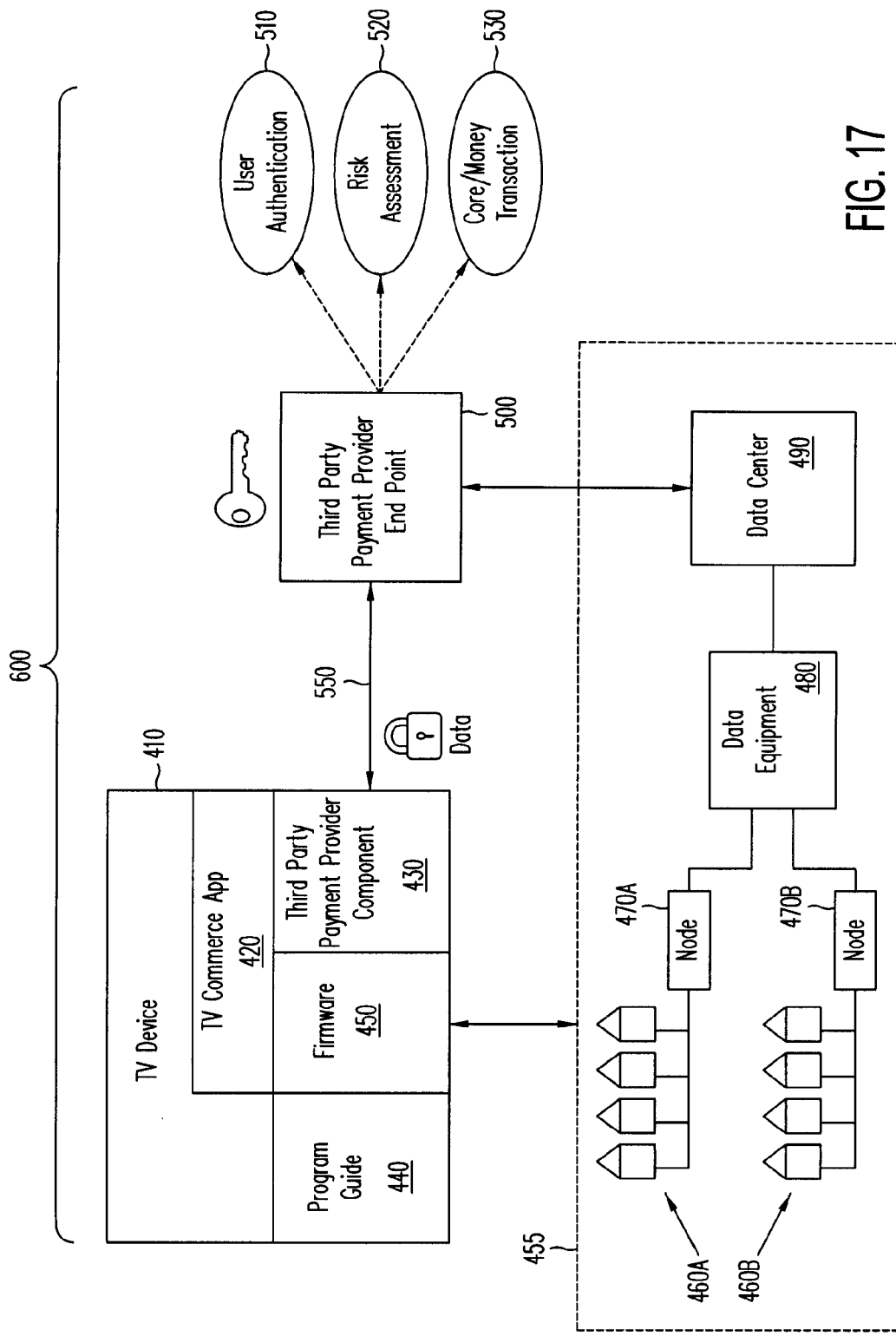

FIG. 17 illustrates a simplified block diagram of a media infrastructure 600 that can be used to implement the interactive shopping through a TV as discussed above. For reasons of consistency and clarity, similar components of the media infrastructure 400 and the media infrastructure 600 are labeled the same in FIGS. 16 and 17.

Referring to FIG. 17, the media infrastructure 600 includes a TV device 410, which contains a TV commerce app 420, a third party payment provider component 430, a program guide 440, and firmware 450. The media infrastructure 600 also includes homes 460, nodes 470, the data equipment 480, the data center 490, and the third party payment provider end point 500. Similar to the media infrastructure 400 of FIG. 16, the nodes 470, the data equipment 480, and the data center 490 are parts of a layered analog media network. Unlike the media infrastructure 400, however, the TV device 410 is Internet-capable. The TV device 410 directly communicates with the third party payment provider end point 500, without any terminations on any of the intermediate hops (e.g., the nodes 470, the data equipment 480, the data center 490). In some embodiments, the TV device 410 communicates with the third party payment provider end point 500 in a secure manner such as through a SSL handshake. And since there are no terminations in the intermediate hops, the security measures herein may not be as strict as in the media infrastructure 400. For example, channel encryption alone may be sufficient for the communication between the TV device 410 and the third party payment provider endpoint 500.

Thus, according to various aspects of the present disclosure, a user (or a plurality of users) is allowed to make an instant purchase from a TV device without requiring an account set-up or the use of a personal computer (or other computing device). In certain embodiments, a third party payment provider digital component based on an STB ecosystem (e.g., EBIF Application) is embedded into STB (based on EBIF runtime). Changes are made to the EBIF specifications to enable security and to embed the interactive functionality into runtime. The interactive functionality enables an end user to directly make payments through a TV. These aspects of the present disclosure may involve one or more of the following elements:

User/Device registration to associate a user with a device.
Site key management to associate a user with a third party payment provider, which enables a user to enter user credentials in a secure way.
User authentication/authorization for a user to authenticate with their credentials (e.g., mobile number/PIN, username/password) and to authorize the payment.
Application authorization to authorize applications using third party payment provider applications for basic or advanced level functionality.
Third party payment provider controlled user interface and interaction to dynamically determine the authentication schemes.
Ability to execute in-line payments (simple, split payments), without being re-directed to the third party payment provider.

These elements offer enhanced security (e.g., site key and message encryption) and allow full control of the user interaction, including multiple users on a single device.

According to various aspects of the present disclosure, an example use case scenario for conducting a simple commercial transaction through a TV device is described below with the following steps:

1. A user clicks a "Pay" button shown in an STB application (e.g., an STB EBIF application).
2. The STB EBIF application sends the "Pay" request (Pay $10 to "ABC"), to the third party payment provider (e.g., PAYPAL) EBIF Library.
3. The third party payment provider EBIF library communicates with the EBIF runtime to authenticate, so as to use/enable message and channel encryption. (Note: the third party payment provider and STB vendor may have already agreed upon public keys to be bundled with the library, so as to enable encryption).
4. The third party payment provider EBIF library communicates with the third party payment provider service to register the device.

5. The third party payment provider responds with a device token and the meta-data of painting the authentication/authorization screens.
6. The third party payment provider EBIF expects the end user to register with the third party payment provider site key to personalize, so as to make sure that the end user is comfortable to enter their credentials.
7. The third party payment provider EBIF library displays a user authentication screen, to collect the login credentials to authenticate the user. With the authentication credentials, it also collects details of the environment for risk and fraud analysis.
8. The user enters the credentials, and an authentication request is sent to the third party payment provider along with the device token and additional data.
9. The third party payment provider responds with an authentication token (AuthN).
10. The third party payment provider EBIF library displays a user authorization screen, to collect the user authorization for the activity (e.g., pay). The relevant request with the AuthN Token is sent to the third party payment provider, which responds back with an Authorization Token (AuthZ).
11. The third party payment provider EBIF library makes a request to the third party payment provider service (e.g., adaptive payments), to execute the pay call with the authorization token (e.g., AuthZ).
12. The third party payment provider EBIF library returns the payment status to the application, with is displayed on the TV screen.

In the manner described above, the third party payment provider is able to provide secure on-device payments within a TV device ecosystem (e.g., set top boxes). Thus, the users will be able to purchase products and services directly from their TV and TV devices without any further interaction with their computing devices (e.g., PC, laptop, or mobile phones).

According to various aspects of the present disclosure, a single digital wallet can also be used to conduct electronic transactions across with different merchants and across different platforms. Such digital wallet may be referred to as a "white label" wallet. Traditionally, when a user or consumer sees a product that he wishes to buy, he can go to that merchant who is offering the product and set up an account with the merchant. His subsequent transactions with that merchant may be done through this account with the merchant. However, if the user wishes to buy a product from a different merchant, the account he set up with the first merchant is useless, and he would have to set up a different account with the second merchant to conduct transactions with the second merchant.

Here, the user can set up an account with the third party payment provider. Once that account is set up, he may use that account to conduct different transactions with different merchants across different platforms. For example, say the user is watching a TV program and sees a first product (e.g., clothing worn by the actor) that he wishes to buy from a first merchant. He can then log in to the third party payment provider in the manner described above to complete the purchase. If the user does not have an account with the third party payment provider, he only needs to set it up once. Afterwards, his login information can be remembered by the TV device (for example, by the set top box) for future transactions.

Thereafter, while watching the same TV program or even a different TV program, if the user sees another product (e.g., a motorcycle that the actor is riding) that he wishes to buy from a different merchant, the same login information for the user can be used to access his account with the third party payment provider again. In some embodiments, the user need not re-enter his login information if it is already remembered. The third party payment provider may complete the user's purchase with the second merchant seamlessly without requiring the user to supply additional data, thereby simplifying the transaction for the user.

In some cases, the user may also wish to supply other types of payment information other than his account access information with the third party payment provider. For example, the user may elect to enter his credit card number or a band account number through the TV device. However, the third party payment provider may still be the back engine that operates "behind the scenes" to facilitate the transaction. For example, if the user has entered a credit card number, from the user's perspective, it is the credit card company who is handling the transaction with a given merchant. In actuality, that merchant may delegate the responsibilities of handling the transaction to the third party payment provider. The third party payment provider may then forward the credit card information supplied by the user to a suitable credit card network. Similarly, had the user provided a bank account number (or an account number with another financial institution), the third party payment provider may forward the bank account number to the appropriate bank or financial institution. This is done without requiring the user to understand what is going on behind the scenes. In other words, the user may be interacting with the third party payment provider without realizing that he is doing so. In this manner, the third party payment provider serves as a "one-size-fits-all" payment platform.

Figure 18:
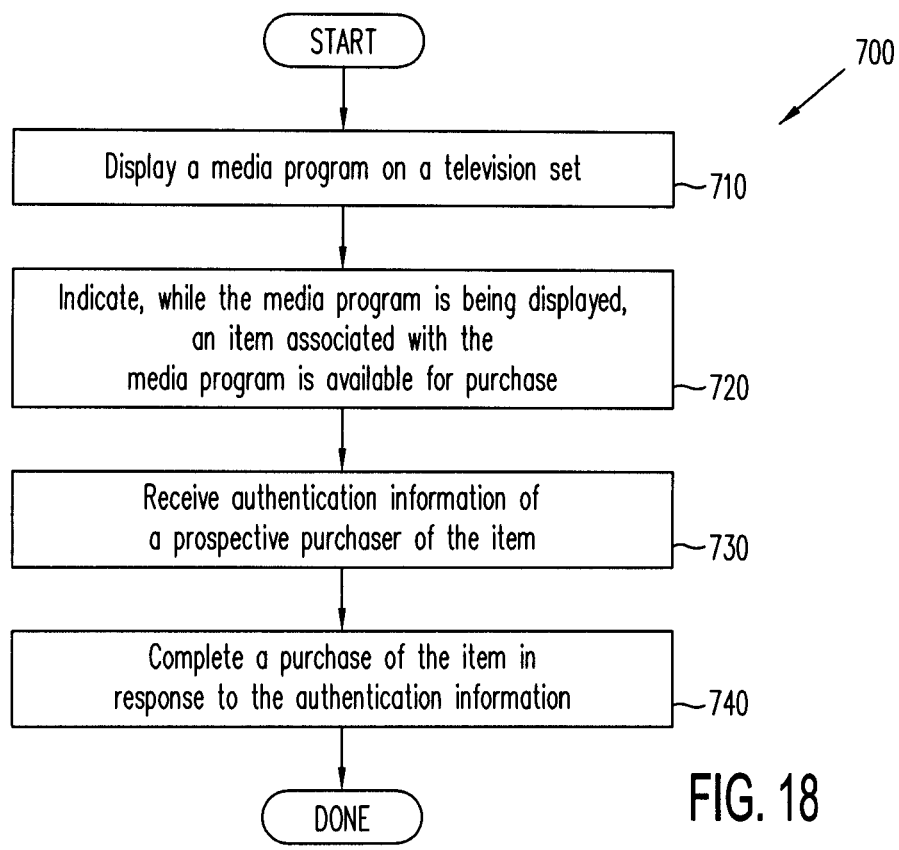
FIGS. 18-21 illustrate example flowcharts for performing a transaction according to various aspects of the present disclosure.

FIG. 18 is a flowchart of a method 700 for performing a transaction according to various aspects of the present disclosure. The method 700 includes a step 710, in which a media program is displayed on a television set. The media program may be streamed from a media content provider. The method 700 includes a step 720, in which a purchasing availability of an item associated with the media program is indicated. The indication occurs while the media program is being displayed. In some embodiments, the indication includes showing an interactive graphical component on the television set. The item could include physical merchandise or digital merchandise. The item is embedded in the media program. In some embodiments, the item includes a product that appears in a scene of the media program while the media program is being displayed. The method 700 includes a step 730, in which authentication information of a prospective purchaser of the item is received. The authentication information may be received through a television remote control. The method 700 includes a step 740, in which a purchase of the item is completed in response to the authentication information. The receiving authentication information and the completing the purchase are performed without exiting the media program.

Figure 19:
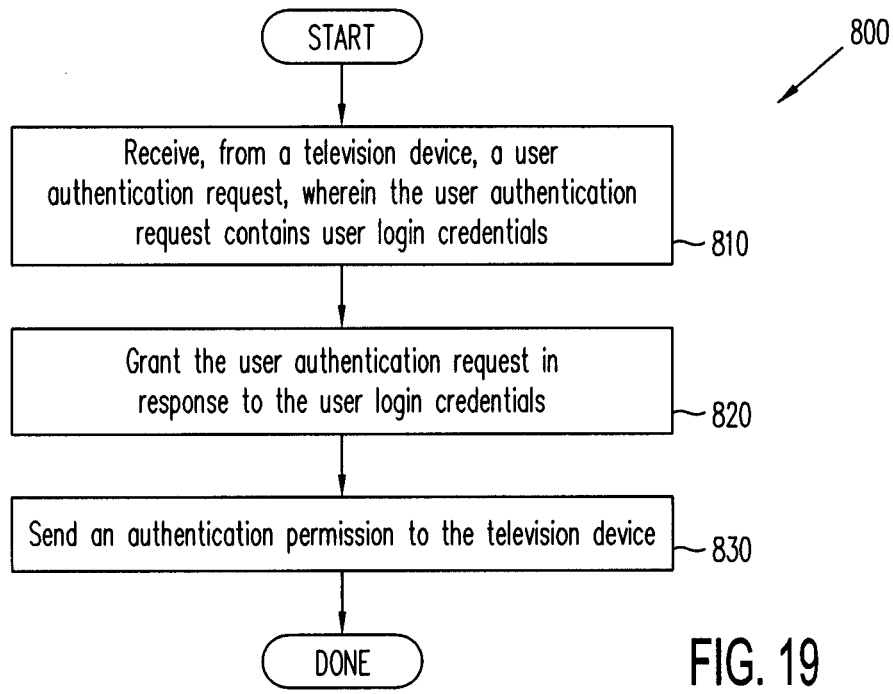

FIG. 19 is a flowchart of a method 800 for performing a transaction according to various aspects of the present disclosure. The method 800 includes a step 810, in which a user authentication request is received from a television device. The user authentication request contains user login credentials. The method 800 includes a step 820, in which the user authentication request is granted in response to the user login credentials. The method 800 includes a step 830, in which an authentication permission is sent to the television device. The steps 810, 820, and 830 are all performed such that the user login credentials and the authentication permission are sent through one or more intermediate hops without being inspected by any of the intermediate hops. In some embodiments, the steps 810, 820, and 830 are all performed by a payment provider server, and the user login credentials are login credentials for accessing a user account with the payment provider server. The intermediate hops may be components of a network for providing Internet access to the television device.

Figure 20:
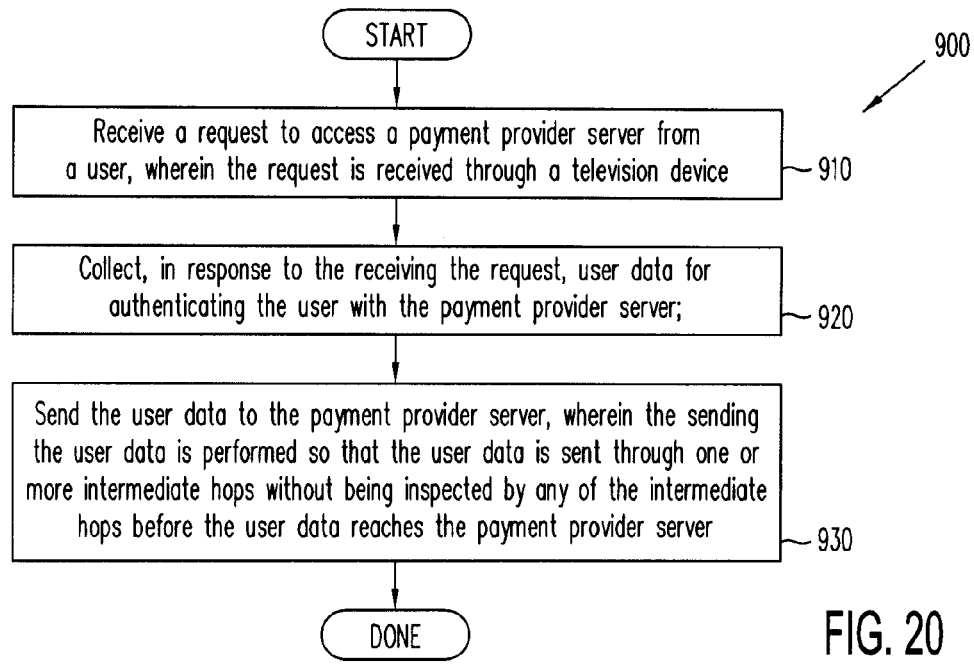

FIG. 20 is a flowchart of a method 900 for performing a transaction according to various aspects of the present disclosure. The method 900 includes a step 910, in which a request to access a payment provider server is received from a user. The request is received through a television device. The request is also electronically processed by a payment provider software application that resides on the television device. The television device may include a television display and a set top box. The method 900 includes a step 920, in which user data for authenticating the user with the payment provider server is collected in response to the receiving the request. The user data contains login credentials of the user for accessing an account of the user with the payment provider. The method 900 includes a step 920, in which the user data is sent to the payment provider server. The step 930 is performed so that the user data is sent through one or more intermediate hops without being inspected by any of the intermediate hops before the user data reaches the payment provider server. The user data is encrypted before it is sent. The intermediate hops are components of a network for providing Internet access to the television device.

Figure 21:
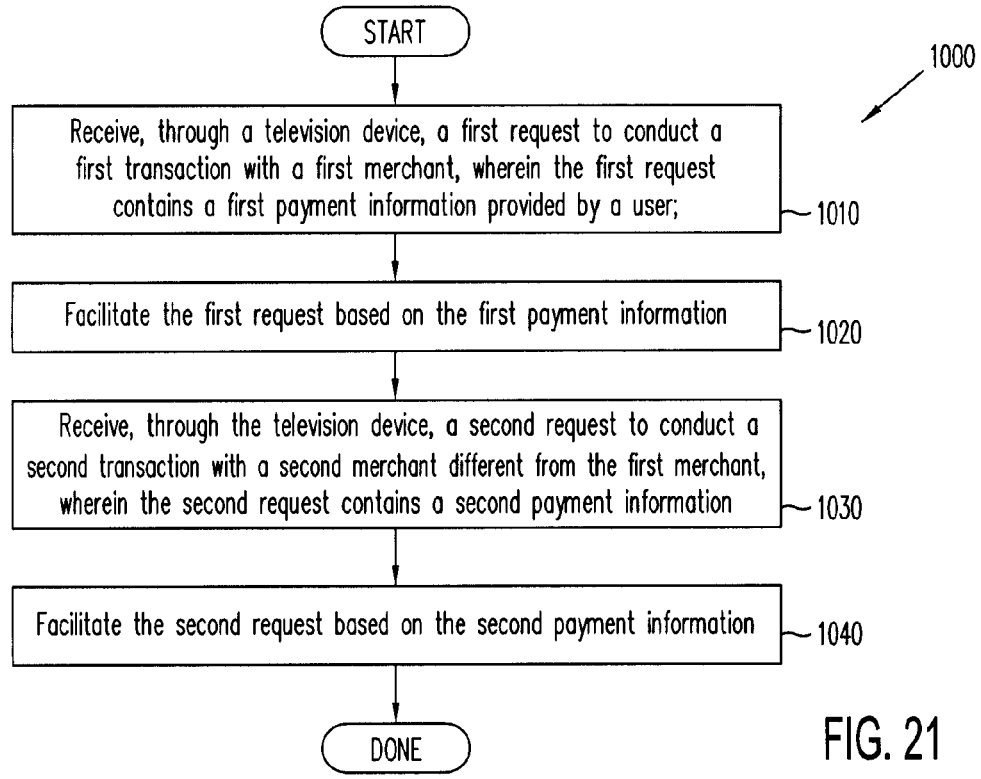

FIG. 21 is a flowchart of a method 1000 for performing a transaction according to various aspects of the present disclosure. The method 1000 includes a step 1010, in which a first request to conduct a first transaction with a first merchant is received through a television device. The first request contains a first payment information provided by a user. The method 1000 includes a step 1020, in which the first request is facilitated based on the first payment information. The method 1000 includes a step 1030, in which the second request to conduct a second transaction with a second merchant is received through the television device. The second merchant is different from the first merchant. The second request contains a second payment information. The method 1000 includes a step 1040, in which the second request is facilitated based on the second payment information. The facilitating the first request and the facilitating the second request are both performed by a third party payment provider.

Figure 22:
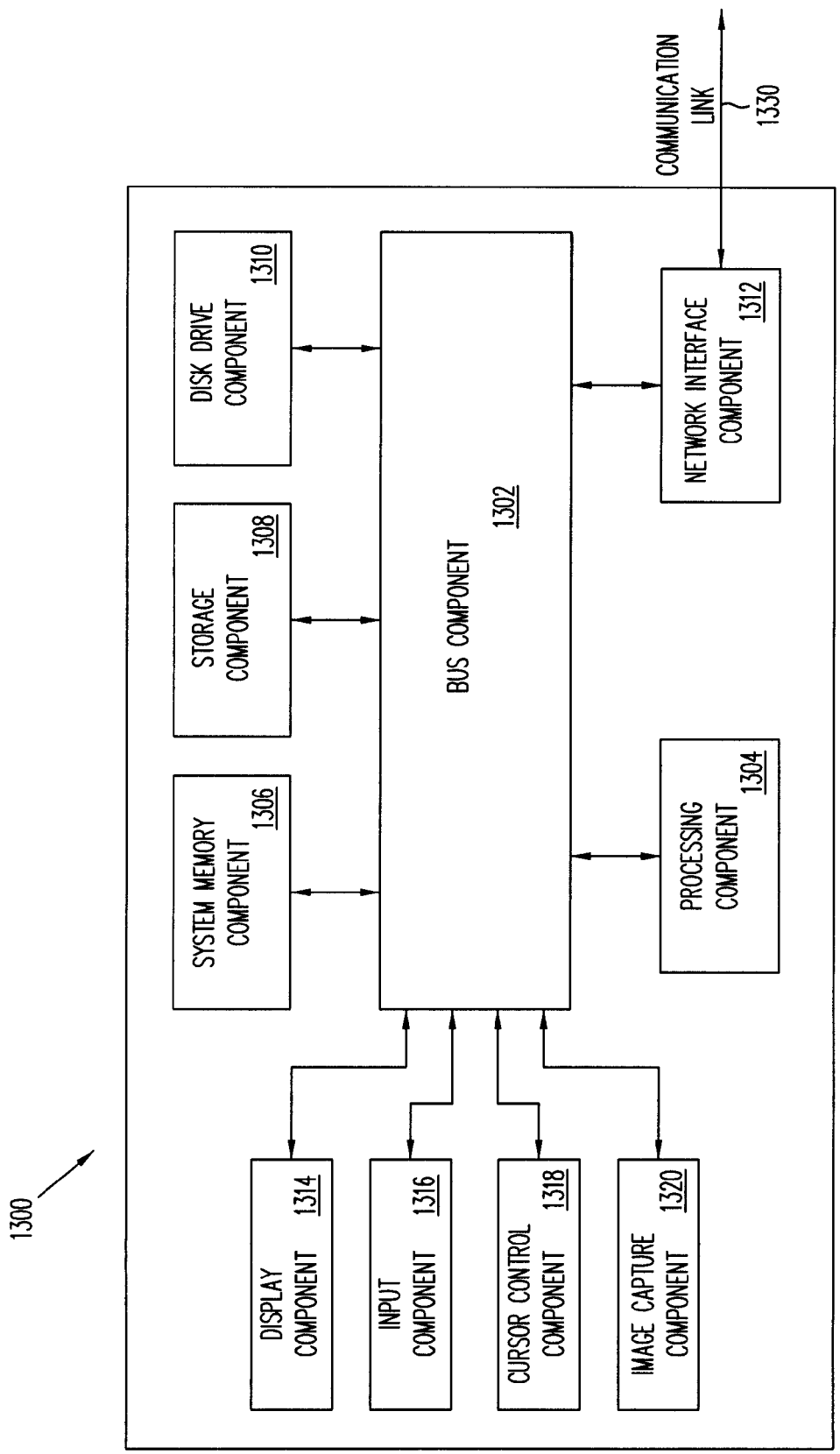
FIG. 22 illustrates a block diagram of a computer system for implementing various methods and devices described according to various aspects of the present disclosure.

FIG. 22 is a block diagram of a computer system 1300 suitable for implementing various methods and devices described herein, for example, the various method steps of the methods 700, 800, 900, or 1000. In various implementations, the devices capable of performing the steps may comprise a network communications device (e.g., mobile cellular phone, laptop, personal computer, tablet, etc.), a network computing device (e.g., a network server, a computer processor, an electronic communications interface, etc), or another suitable device. Accordingly, it should be appreciated that the devices capable of implementing the methods 700, 800, 900, and 1000 may be implemented as the computer system 1300 in a manner as follows.

In accordance with various embodiments of the present disclosure, the computer system 1300, such as a network server or a mobile communications device, includes a bus component 1302 or other communication mechanisms for communicating information, which interconnects subsystems and components, such as processing component 1304 (e.g., processor, micro-controller, digital signal processor (DSP), etc.), system memory component 1306 (e.g., RAM), static storage component 1308 (e.g., ROM), disk drive component 1310 (e.g., magnetic or optical), network interface component 1312 (e.g., modem or Ethernet card), display component 1314 (e.g., cathode ray tube (CRT) or liquid crystal display (LCD)), input component 1316 (e.g., keyboard), cursor control component 1318 (e.g., mouse or trackball), and image capture component 1320 (e.g., analog or digital camera). In one implementation, disk drive component 1310 may comprise a database having one or more disk drive components.

In accordance with embodiments of the present disclosure, computer system 1300 performs specific operations by processor 1304 executing one or more sequences of one or more instructions contained in system memory component 1306. Such instructions may be read into system memory component 1306 from another computer readable medium, such as static storage component 1308 or disk drive component 1310. In other embodiments, hard-wired circuitry may be used in place of (or in combination with) software instructions to implement the present disclosure.

Logic may be encoded in a computer readable medium, which may refer to any medium that participates in providing instructions to processor 1304 for execution. Such a medium may take many forms, including but not limited to, non-volatile media and volatile media. In one embodiment, the computer readable medium is non-transitory. In various implementations, non-volatile media includes optical or magnetic disks, such as disk drive component 1310, and volatile media includes dynamic memory, such as system memory component 1306. In one aspect, data and information related to execution instructions may be transmitted to computer system 1300 via a transmission media, such as in the form of acoustic or light waves, including those generated during radio wave and infrared data communications. In various implementations, transmission media may include coaxial cables, copper wire, and fiber optics, including wires that comprise bus 1302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 1300. In various other embodiments of the present disclosure, a plurality of computer systems 1300 coupled by communication link 1330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 1300 may transmit and receive messages, data, information and instructions, including one or more programs (i.e., application code) through communication link 1330 and communication interface 1312. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

It is also understood that although a television device has been used to illustrate the various concepts of the present disclosure, other types of media display devices may also be used in different embodiments. For example, a computer tablet or a smart phone may also be used to perform the various functions of the television set discussed above (e.g., displaying a media program, etc).

One of the broader forms of the present disclosure involves a method of conducting a transaction. The method includes: displaying a media program on a television set; indicating, while the media program is being displayed, an item associated with the media program is available for purchase; receiving authentication information of a prospective purchaser of the item; and completing a purchase of the item in response to the authentication information.

In some embodiments, the displaying the media program comprises streaming the media program from a media content provider to the television set.

In some embodiments, the indicating comprises showing an interactive graphical component on the television set.

In some embodiments, the item comprises one of: physical merchandise and digital merchandise.

In some embodiments, the item is embedded in the media program.

In some embodiments, the item comprises a product that appears in a scene of the media program while the media program is being displayed.

In some embodiments, the receiving the authentication information and the completing the purchase are each performed without exiting the media program.

In some embodiments, the receiving the authentication information is performed through a television remote control.

Another one of the broader forms of the present disclosure involves an apparatus comprising a non-transitory, tangible machine-readable storage medium storing a computer program, wherein the computer program contains machine-readable instructions that when executed electronically by processors, perform: displaying a media program on a television set; indicating, while the media program is being displayed, an item associated with the media program is available for purchase; receiving authentication information of a prospective purchaser of the item; and completing a purchase of the item in response to the authentication information.

In some embodiments, the instructions for displaying the media program comprise instructions for streaming the media program from a media content provider to the television set.

In some embodiments, the instructions for indicating the item is available for purchase comprise instructions for showing an interactive graphical component on the television set.

In some embodiments, the item comprises one of: physical merchandise and digital merchandise.

In some embodiments, the item is embedded in the media program.

In some embodiments, the item comprises a product that appears in a scene of the media program while the media program is being displayed.

In some embodiments, the instructions for receiving the authentication information and the instructions for completing the purchase are each executed without forcing the media program to exit.

In some embodiments, the instructions for receiving the authentication information comprise instructions for receiving the authentication information through a television remote control.

Yet another one of the broader forms of the present disclosure involves an apparatus. The apparatus includes: a television set operable to: display a media program; and indicate, while the media program is being displayed, an item associated with the media program is available for purchase; and a set top box coupled to the television set, wherein the set top box is operable to: receive authentication information of a prospective purchaser of the item; and complete a purchase of the item in response to the authentication information.

In some embodiments, the television set is operable to show an interactive graphical component to the prospective purchase to indicate the item is available for purchase.

In some embodiments, the item comprises one of: physical merchandise and digital merchandise.

In some embodiments, the item is embedded in the media program.

In some embodiments, the set top box is operable to receive the authentication information and to complete the purchase without causing the television set to exit the media program.

In some embodiments, the set top box is operable to stream the media program from a media content provider to the television set.

Another one of the broader forms of the present disclosure involves a method of conducting an electronic transaction. The method includes: receiving, from a television device, a user authentication request, wherein the user authentication request contains user login credentials; granting the user authentication request in response to the user login credentials; and thereafter sending an authentication permission to the television device; wherein the receiving the user authentication request and the sending the authentication permission are each performed such that the user login credentials and the authentication permission are sent through one or more intermediate hops without being inspected by any of the intermediate hops.

In some embodiments, the receiving, the granting, and the sending are performed by a payment provider server; and the user login credentials are login credentials for accessing a user account with the payment provider server.

In some embodiments, the granting of the user authentication request comprises generating an authentication token; and the sending the authentication permission comprises sending the authentication token to the television device.

In some embodiments, the user authentication request is encrypted when it is received, and the method further includes: decrypting the user authentication request after it is received; and encrypting the authentication permission before it is sent.

In some embodiments, the intermediate hops are components of a network for providing Internet access to the television device.

In some embodiments, the network comprises one of: a cable television network and a satellite television network.

In some embodiments, the sending the authentication permission is performed such that the authentication permission is sent to a payment provider software application that resides on the television device.

In some embodiments, the television device comprises a television display and a set top box.

Another one of the broader forms of the present disclosure involves an apparatus comprising a non-transitory, tangible machine-readable storage medium storing a computer program, wherein the computer program contains machine-readable instructions that when executed electronically by processors, perform: receiving, from a television device, a user authentication request, wherein the user authentication request contains user login credentials; granting the user authentication request in response to the user login credentials; and thereafter sending an authentication permission to the television device; wherein the receiving the user authentication request and the sending the authentication permission are each performed such that the user login credentials and the authentication permission are sent through one or more intermediate hops without being inspected by any of the intermediate hops.

In some embodiments, the instructions for the receiving, the granting, and the sending are executed by a payment provider server; and the user login credentials are login credentials for accessing a user account with the payment provider server.

In some embodiments, the instructions for granting the user authentication request comprise instructions for generating an authentication token; and the instructions for sending the authentication permission comprise instructions for sending the authentication token to the television device.

In some embodiments, the user authentication request is encrypted when it is received, and wherein the instructions further comprise: instructions for decrypting the user authentication request after it is received; and instructions for encrypting the authentication permission before it is sent.

In some embodiments, the intermediate hops are components of a network for providing Internet access to the television device.

In some embodiments, the network comprises one of: a cable television network and a satellite television network.

In some embodiments, the instructions for sending the authentication permission are executed such that the authentication permission is sent to a payment provider software application that resides on the television device.

In some embodiments, the television device comprises a television display and a set top box.

Yet another one of the broader forms of the present disclosure involves a method of conducting an electronic transaction. The method includes: receiving a request to access a payment provider server from a user, wherein the request is received through a television device; collecting, in response to the receiving the request, user data for authenticating the user with the payment provider server; and sending the user data to the payment provider server, wherein the sending the user data is performed so that the user data is sent through one or more intermediate hops without being inspected by any of the intermediate hops before the user data reaches the payment provider server.

In some embodiments, the user data comprises login credentials of the user for accessing an account of the user with the payment provider.

In some embodiments, the receiving of the request is performed such that the request is electronically processed by a payment provider software application that resides on the television device.

In some embodiments, the sending of the user data comprises encrypting the user data.

In some embodiments, the method further includes: receiving user authentication information from the payment provider server after the sending the user data.

In some embodiments, the television device comprises a television display and a set top box.

In some embodiments, the intermediate hops are components of a network for providing Internet access to the television device.

Another one of the broader forms of the present disclosure involves a method of conducting a transaction. The method includes: receiving, through a television device, a first request to conduct a first transaction with a first merchant, wherein the first request contains a first payment information provided by a user; facilitating the first request based on the first payment information; receiving, through the television device, a second request to conduct a second transaction with a second merchant different from the first merchant, wherein the second request contains a second payment information; and facilitating the second request based on the second payment information; wherein the facilitating the first request and the facilitating the second request are both performed by a third party payment provider.

In some embodiments, the first payment information and the second payment information each include at least one of: credentials for accessing an account of the user with the third party payment provider, and a credit card number of the user, and a bank account of the user.

In some embodiments, the facilitating of the first request and the facilitating of the second request include granting the first request and granting the second request, if the first payment information and the second payment information include the credentials for accessing the account of the user with the third party payment provider.

In some embodiments, the facilitating of the first request and the facilitating of the second request include forwarding the first request and forwarding the second request to a respective financial institution, if the first payment information and the second payment information include the credit card number or the bank account of the user.

In some embodiments, the first payment information and the second payment information are the same.

In some embodiments, the method further includes: remembering at least one of the first payment information and the second payment information for future transactions of the user.

In some embodiments, the first transaction is a purchase of a first product offered by the first merchant in response to the first product being displayed on the television device; and the second transaction is a purchase of a second product offered by the second merchant in response to the second product being displayed on the television device.

In some embodiments, the first product and the second product are each integrated in one or more television programs being displayed on the television device.

Yet another one of the broader forms of the present disclosure involves an apparatus comprising a non-transitory, tangible machine-readable storage medium storing a computer program, wherein the computer program contains machine-readable instructions that when executed electronically by processors, perform: receiving, through a television device, a first request to conduct a first transaction with a first merchant, wherein the first request contains a first payment information provided by a user; facilitating the first request based on the first payment information; receiving, through the television device, a second request to conduct a second transaction with a second merchant different from the first merchant, wherein the second request contains a second payment information; and facilitating the second request based on the second payment information; wherein the facilitating the first request and the facilitating the second request are both performed by a third party payment provider.

In some embodiments, the first payment information and the second payment information each include at least one of: credentials for accessing an account of the user with the third party payment provider, and a credit card number of the user, and a bank account of the user.

In some embodiments, the instructions for facilitating the first request and the instructions for facilitating the second request include instructions for granting the first request and instructions for granting the second request, if the first payment information and the second payment information include the credentials for accessing the account of the user with the third party payment provider.

In some embodiments, the instructions for facilitating the first request and the instructions for facilitating the second request include instructions for forwarding the first request and instructions for forwarding the second request to a respective financial institution, if the first payment information and the second payment information include the credit card number or the bank account of the user.

In some embodiments, the first payment information and the second payment information are the same.

In some embodiments, the computer program further contains: instructions for remembering at least one of the first payment information and the second payment information for future transactions of the user.

In some embodiments, the first transaction is a purchase of a first product offered by the first merchant in response to the first product being displayed on the television device; and the second transaction is a purchase of a second product offered by the second merchant in response to the second product being displayed on the television device.

In some embodiments, the first product and the second product are each integrated in one or more television programs being displayed on the television device.

Yet another one of the broader forms of the present disclosure involves a method of conducting a transaction. The method includes: receiving, from a user, a first purchasing request to buy a first product from a first merchant, wherein the first purchasing request is entered through a television device and contains login credentials for accessing an account of the user with a payment provider; authorizing the first purchasing request based on the login credentials; receiving, from the user, a second purchasing request to buy a second product from a second merchant different from the first merchant, wherein the second purchasing request is entered through the television device and contains the login credentials for accessing the account of the user; and authorizing the second purchasing request based on the login credentials.

In some embodiments, the authorizing the first purchasing request and the authorizing the second purchasing request are both performed by a server of the payment provider.

In some embodiments, the login credentials are remembered for the second purchasing request.

In some embodiments, the first purchasing request is received in response to the first product being demonstrated in a television program playing on the television device; and the second purchasing request is received in response to the second product being demonstrated in the television program playing on the television device.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of conducting an electronic transaction, comprising:
   receiving, from a software application installed on a media display device that is playing a video stream, a user authentication request, wherein the user authentication request contains user login credentials, and wherein the media display device is one of: a television display and a set top box, and wherein the receiving occurs at one or more trigger points embedded in the video stream;
   granting the user authentication request in response to the user login credentials; and
   thereafter sending an authentication permission to the media display device;
   wherein the receiving, the granting, and the sending are performed by a payment provider server, wherein the receiving the user authentication request and the sending the authentication permission are each performed such that the user login credentials and the authentication permission are sent through one or more intermediate hops without being inspected by any of the intermediate hops, wherein the intermediate hops include hardware components of a cable television network or a satellite television network for providing Internet access to the media display device, and wherein the intermediate hops are located outside of a home of the user and serve as relay points between the media display device and the payment provider server.

2. The method of claim 1, wherein:
   the user login credentials are login credentials for accessing a user account with the payment provider server.

3. The method of claim 1, wherein:
   the granting the user authentication request comprises generating an authentication token; and
   the sending the authentication permission comprises sending the authentication token to the media display device.

4. The method of claim 1, wherein the user authentication request is encrypted when it is received, and further comprising:
   decrypting the user authentication request after it is received; and
   encrypting the authentication permission before it is sent.

5. The method of claim 1, wherein the sending the authentication permission is performed such that the authentication permission is sent to the software application.

6. An apparatus comprising a non-transitory, tangible machine-readable storage medium storing a computer program, wherein the computer program contains machine-readable instructions that when executed electronically by processors, perform:

receiving, from a software application installed on a media display device that is playing a video stream, a user authentication request, wherein the user authentication request contains user login credentials, and wherein the media display device is one of: a television display and a set top box, and wherein the receiving occurs at one or more trigger points embedded in the video stream;

granting the user authentication request in response to the user login credentials; and thereafter sending an authentication permission to the media display device;

wherein the instructions for the receiving, the granting, and the sending are executed by a payment provider server, and wherein the receiving the user authentication request and the sending the authentication permission are each performed such that the user login credentials and the authentication permission are sent through one or more intermediate hops without being inspected by any of the intermediate hops, wherein the intermediate hops include hardware components of a cable television network or a satellite television network for providing Internet access to the media display device, and wherein the intermediate hops are located outside of a home of the user and serve as relay points between the media display device and the payment provider server.

7. The apparatus of claim 6, wherein:
the user login credentials are login credentials for accessing a user account with the payment provider server.

8. The apparatus of claim 6, wherein:
the instructions for granting the user authentication request comprise instructions for generating an authentication token; and
the instructions for sending the authentication permission comprise instructions for sending the authentication token to the media display device.

9. The apparatus of claim 6, wherein the user authentication request is encrypted when it is received, and wherein the instructions further comprise:
instructions for decrypting the user authentication request after it is received; and
instructions for encrypting the authentication permission before it is sent.

10. The apparatus of claim 6, wherein the instructions for sending the authentication permission are executed such that the authentication permission is sent to the software application.

11. A method of conducting an electronic transaction, comprising:
receiving a request to access a payment provider server from a user, wherein the request is received through a software application installed on a media display device that is playing a video stream, wherein the media display device is one of: a television display and a set top box, and wherein the receiving occurs at one or more trigger points embedded in the video stream;
collecting, in response to the receiving the request, user data for authenticating the user with the payment provider server; and
sending the user data to the payment provider server, wherein the sending the user data is performed so that the user data is sent through one or more intermediate hops without being inspected by any of the intermediate hops before the user data reaches the payment provider server, wherein the intermediate hops include hardware components of a cable television network or a satellite television network for providing Internet access to the media display device, and wherein the intermediate hops are located outside of a home of the user and serve as relay points between the media display device and the payment provider server.

12. The method of claim 11, wherein the user data comprises login credentials of the user for accessing an account of the user with the payment provider.

13. The method of claim 11, wherein the receiving the request is performed such that the request is electronically processed by the software application.

14. The method of claim 11, wherein the sending the user data comprises encrypting the user data.

15. The method of claim 11, further comprising: receiving user authentication information from the payment provider server after the sending the user data.

16. The method of claim 1, wherein the software application is based on an Enhanced TV Binary Interchange Specification (EBIF).

17. The method of claim 2, wherein the payment provider server includes:
a user authentication module for verifying the user login credentials;
a risk assessment module for monitoring a purchasing history of a user that generates the user authentication request; and
a money transaction module for facilitating transfer of funds between an account of the user and a merchant.

18. The apparatus of claim 6, wherein the software application is based on an Enhanced TV Binary Interchange Specification (EBIF).

19. The apparatus of claim 7, wherein the payment provider server includes:
a user authentication module for verifying the user login credentials;
a risk assessment module for monitoring a purchasing history of a user that generates the user authentication request; and
a money transaction module for facilitating transfer of funds between an account of the user and a merchant.

20. The method of claim 11, wherein the software application is based on an Enhanced TV Binary Interchange Specification (EBIF).

21. The method of claim 11, wherein the payment provider server includes:
a user authentication module for verifying the user login credentials;
a risk assessment module for monitoring a purchasing history of a user that generates the user authentication request; and
a money transaction module for facilitating transfer of funds between an account of the user and a merchant.

* * * * *